(12) United States Patent
Hoghaug et al.

(10) Patent No.: US 8,438,400 B2
(45) Date of Patent: May 7, 2013

(54) MULTIPLE USER DESKTOP GRAPHICAL IDENTIFICATION AND AUTHENTICATION

(75) Inventors: Robert John Hoghaug, Prior Lake, MN (US); Thomas Andrew Hoghaug, Chanhassen, MN (US)

(73) Assignee: Indigo Identityware, Inc., Edina, MN (US)

( * ) Notice: Subject to any disclaimer, the term of this patent is extended or adjusted under 35 U.S.C. 154(b) by 1679 days.

(21) Appl. No.: 11/329,216

(22) Filed: Jan. 10, 2006

(65) Prior Publication Data
US 2007/0101155 A1 May 3, 2007

Related U.S. Application Data

(60) Provisional application No. 60/643,029, filed on Jan. 11, 2005, provisional application No. 60/653,249, filed on Feb. 15, 2005, provisional application No. 60/653,250, filed on Feb. 15, 2005.

(51) Int. Cl.
*H04L 29/06* (2006.01)

(52) U.S. Cl.
USPC .......................................................... 713/189

(58) Field of Classification Search .............. 713/1, 189, 713/202; 709/201, 229; 717/168
See application file for complete search history.

(56) References Cited

U.S. PATENT DOCUMENTS

| | | | |
|---|---|---|---|
| 5,948,064 A | 9/1999 | Bertram et al. | |
| 6,144,959 A | 11/2000 | Anderson et al. | |
| 6,725,269 B1 | 4/2004 | Megiddo | |
| 6,732,179 B1 | 5/2004 | Brown et al. | |
| 7,107,538 B1 | 9/2006 | Hinckley et al. | |
| 7,114,075 B1 | 9/2006 | Yasuda et al. | |
| 7,124,370 B2 | 10/2006 | Fish | |
| 7,185,066 B2 * | 2/2007 | Noble et al. | ................ 709/217 |
| 7,188,314 B2 | 3/2007 | Mizrah | |
| 7,233,927 B1 | 6/2007 | Norton et al. | |

(Continued)

FOREIGN PATENT DOCUMENTS

| | | |
|---|---|---|
| WO | WO 2006/017112 A2 | 2/2006 |
| WO | WO 2007/081834 A2 | 7/2007 |
| WO | WO 2007/095097 A2 | 8/2007 |
| WO | WO 2007/100468 A2 | 9/2007 |

OTHER PUBLICATIONS

McFedries, "The Complete Idiot's Guide to Windows XP", Table of Contents, Oct. 3, 2001, Alpha Books, Chapter 2. A Field Guide to Windows XP: Starting Windows XP-printed pp. 1-3, Chapter 13: Avoiding Fistfights While Sharing Your Computer—printed pp. 1-2, Chapter 13: Logging on to an Account-printed p. 1.

(Continued)

*Primary Examiner* — William Goodchild
(74) *Attorney, Agent, or Firm* — Schwegman Lundberg & Woessner, P.A.

(57) ABSTRACT

A multiple user desktop graphical identification and authentication configured as a loadable dynamic link library (DLL) intended to replace the default Microsoft graphical identification and authentication. It has the ability to create secure, private logon sessions for each user that logs on to the system. There can be up to at least thirteen users logged in at the same time and each user will have their own desktop environment. Auto log off functions may be set based on time of inactivity and/or number of individual users. The multiple user desktop graphical identification and authentication functions in a domain and non-networked environments and needs no added hardware.

18 Claims, 25 Drawing Sheets

FLOW DIAGRAM

U.S. PATENT DOCUMENTS

| | | | |
|---|---|---|---|
| 7,519,910 B2 * | 4/2009 | Saka | 715/748 |
| 2003/0046401 A1 | 3/2003 | Abbott et al. | |
| 2003/0196107 A1 | 10/2003 | Robertson et al. | |
| 2004/0010724 A1 | 1/2004 | Brown et al. | |
| 2004/0088682 A1 * | 5/2004 | Thompson et al. | 717/124 |
| 2004/0088692 A1 * | 5/2004 | Stutton et al. | 717/168 |
| 2004/0139309 A1 * | 7/2004 | Gentil et al. | 713/1 |
| 2004/0139355 A1 | 7/2004 | Axel et al. | |
| 2004/0215791 A1 * | 10/2004 | Tsao | 709/229 |
| 2004/0220996 A1 * | 11/2004 | Huang et al. | 709/201 |
| 2004/0254890 A1 | 12/2004 | Sancho et al. | |
| 2005/0066202 A1 * | 3/2005 | Evans et al. | 713/202 |
| 2005/0184145 A1 | 8/2005 | Law et al. | |
| 2005/0188316 A1 | 8/2005 | Ghanamgari et al. | |
| 2005/0188317 A1 | 8/2005 | Matthews et al. | |
| 2005/0235139 A1 | 10/2005 | Hoghaug et al. | |
| 2007/0074119 A1 | 3/2007 | Komine et al. | |
| 2007/0136482 A1 | 6/2007 | Hoghaug et al. | |
| 2007/0136581 A1 | 6/2007 | Hoghaug et al. | |
| 2008/0034219 A1 | 2/2008 | Ting | |

OTHER PUBLICATIONS

Office Action dated Oct. 26, 2010, for U.S. Appl. No. 10/888,039, Inventors Hoghaug et al., filed Jul. 9, 2004.

Application and File History of U.S. Appl. No. 10/888,039, Inventors Hoghaug et al., filed Jul. 9, 2004.

Application and File History of U.S. Appl. No. 11/352,563, Inventors Hoghaug et al., filed Feb. 13, 2006.

Application and File History of U.S. Appl. No. 11/352,966, Inventors Hoghaug et al., filed Feb. 13, 2006.

* cited by examiner

| FIG. 2a | FIG. 2b |
|---------|---------|
| FIG. 2c | FIG. 2d |

| FIG. 3a | FIG. 3b |
|---------|---------|
| FIG. 3c | FIG. 3d |

| FIG. 4a | FIG. 4b |
|---------|---------|
| FIG. 4c | FIG. 4d |

| FIG. 5a | FIG. 5b |
|---------|---------|
| FIG. 5c | FIG. 5d |

| FIG. 6a | FIG. 6b |
|---------|---------|
| FIG. 6c | FIG. 6d |

| FIG. 7a | FIG. 7b |
|---------|---------|
| FIG. 7c | FIG. 7d |

FIG. 1

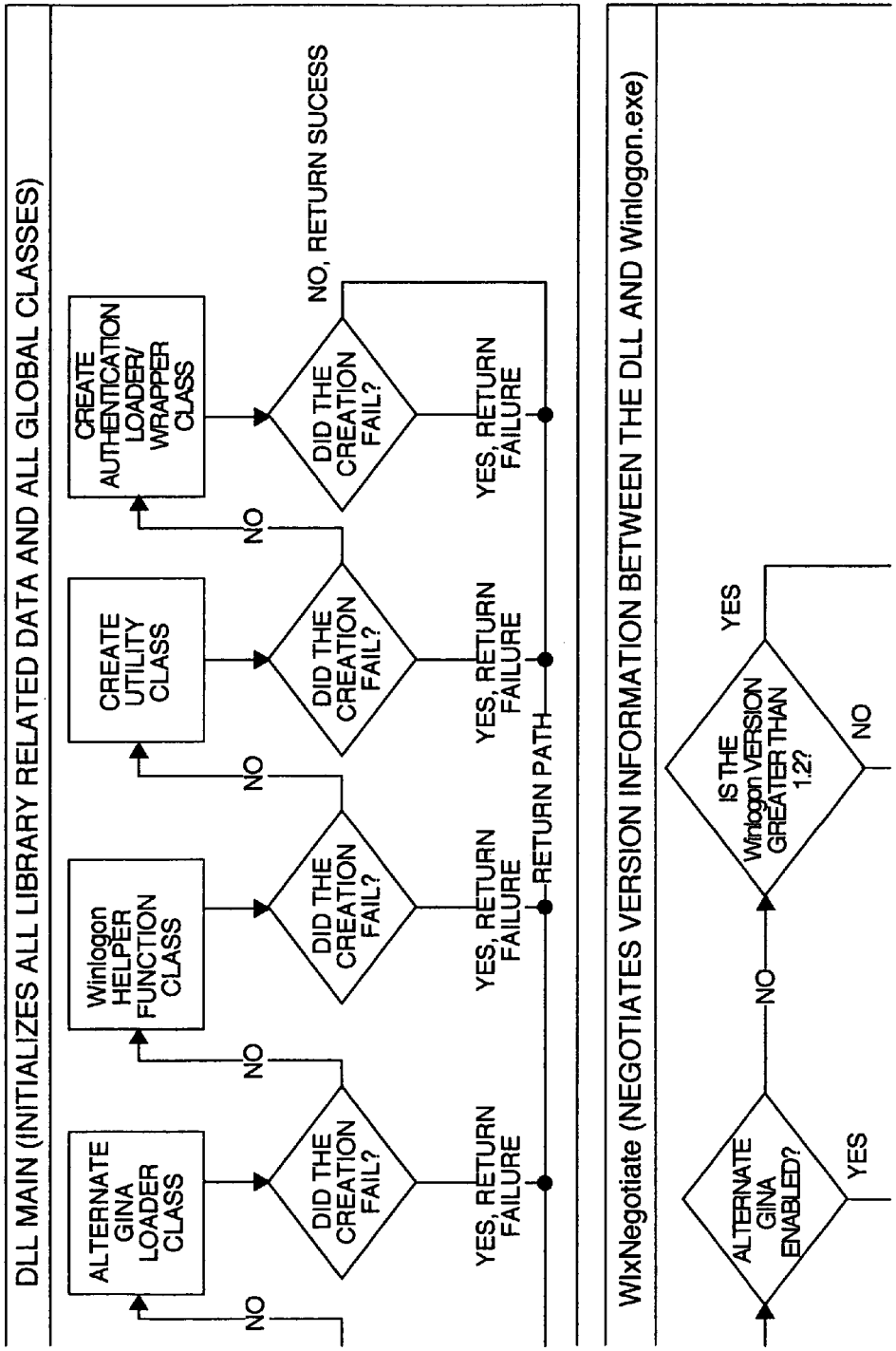

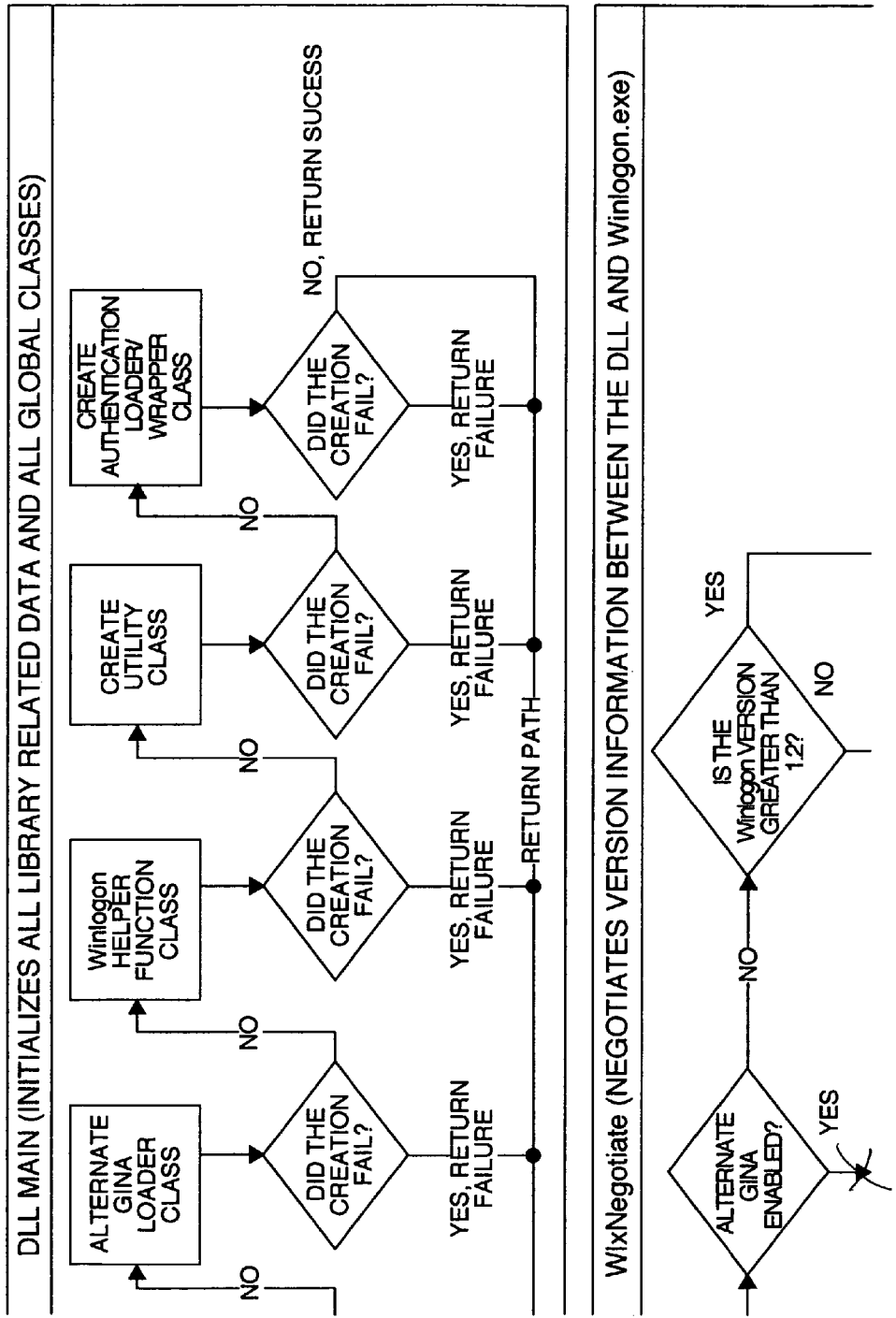

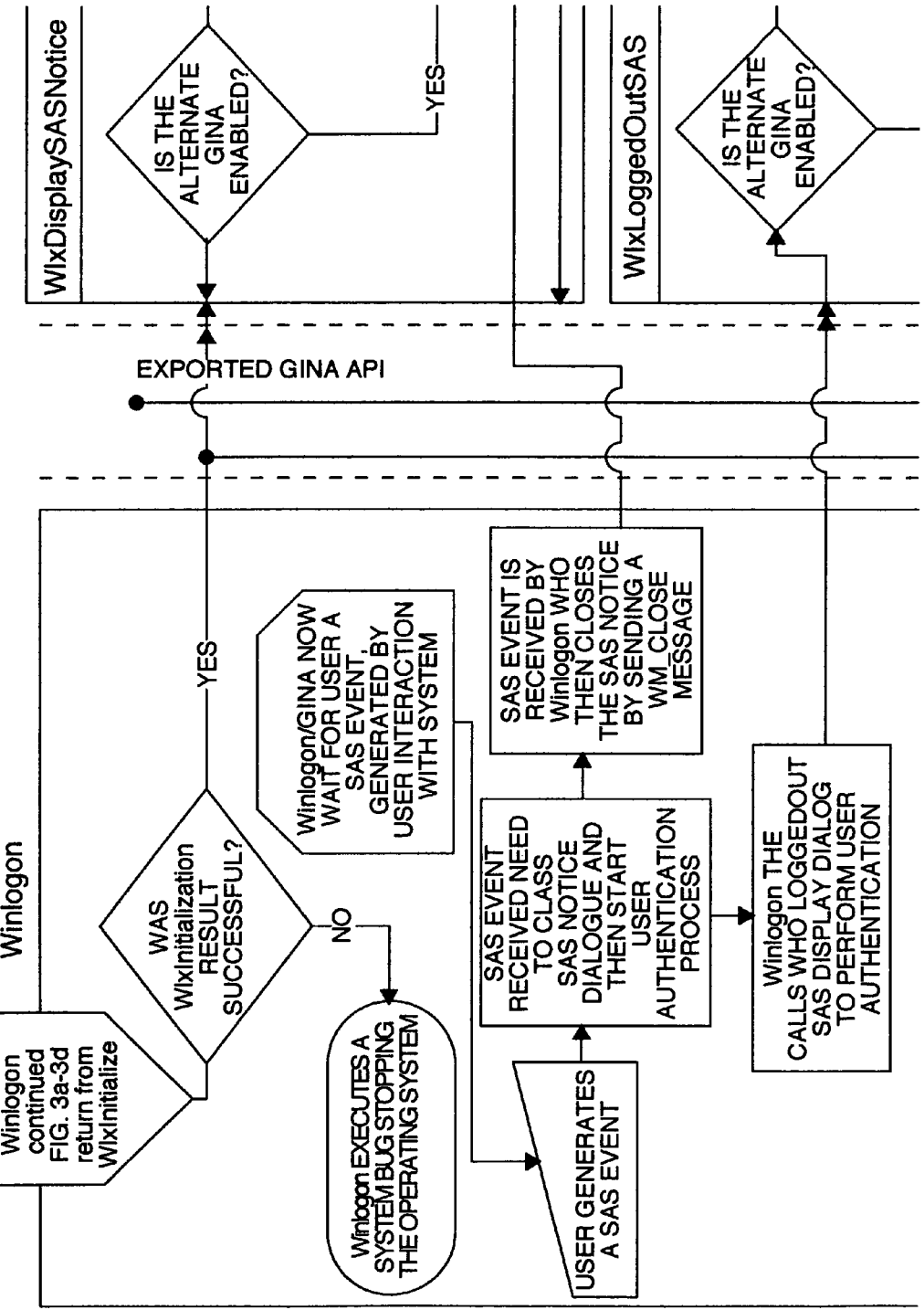

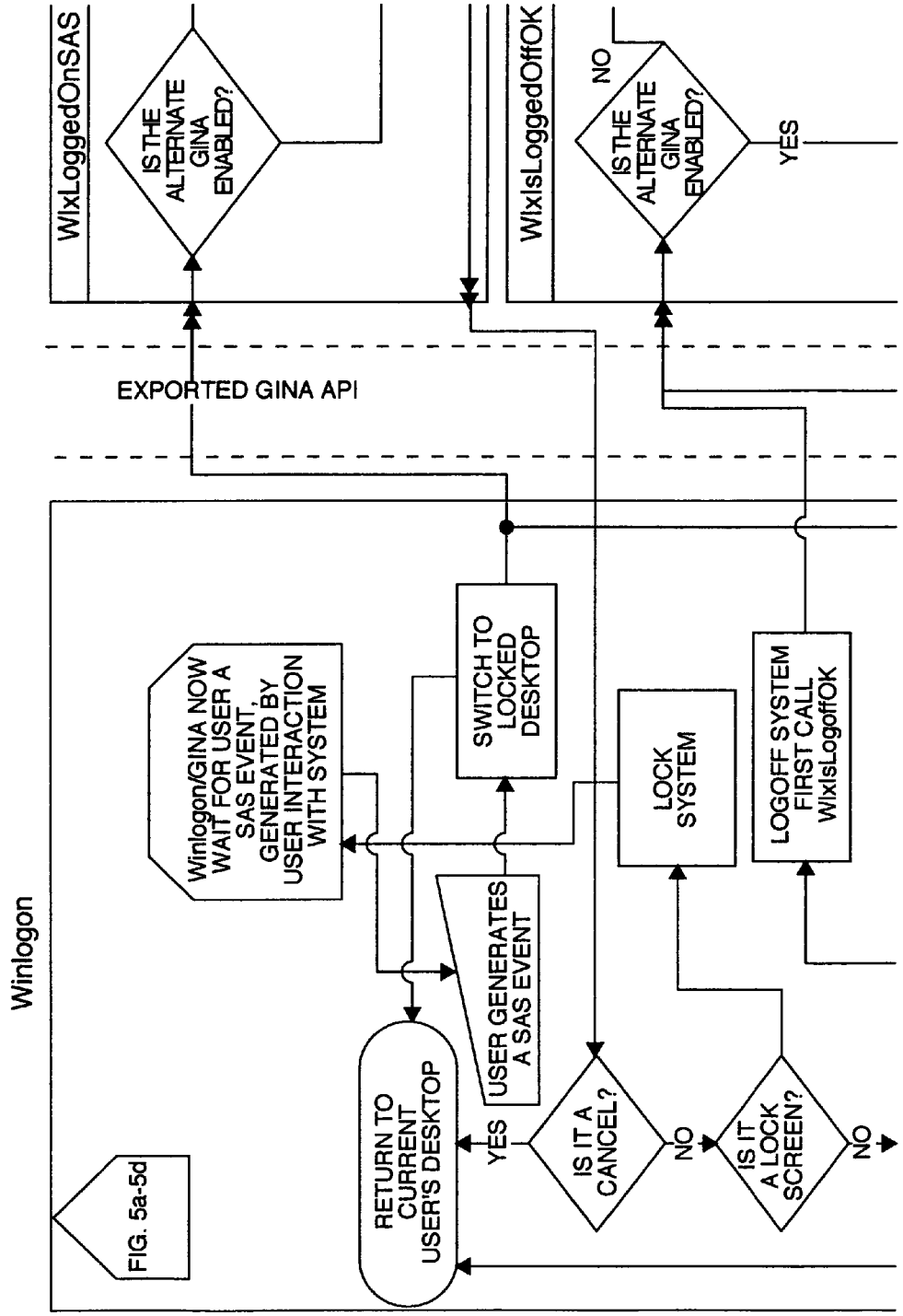

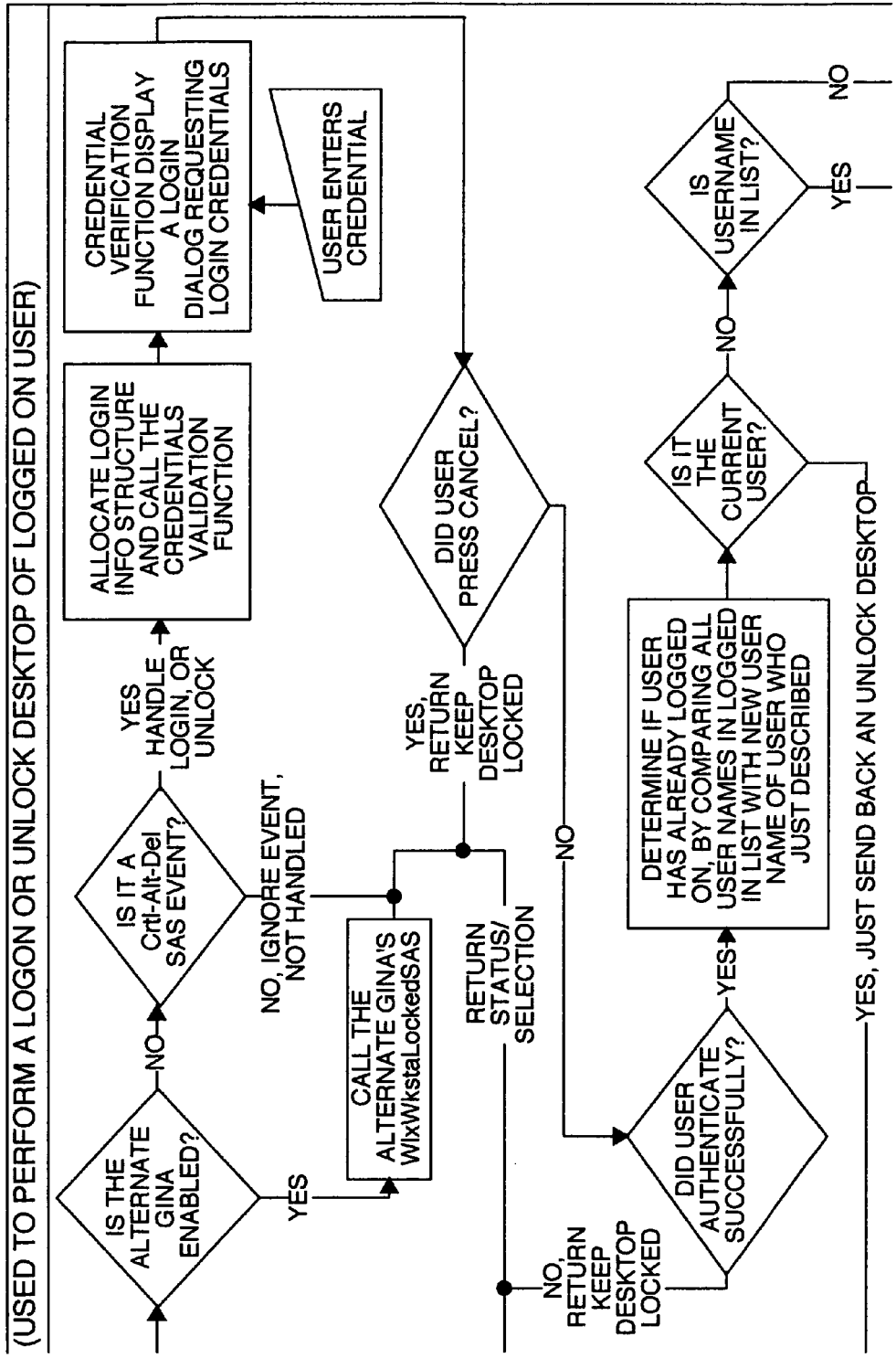

MULTIPLE USER DESKTOP GRAPHICAL IDENTIFICATION AND AUTHENTICATION

CROSS REFERENCES TO RELATED APPLICATIONS

This patent application claims priority from the earlier filed U.S. Provisional Patent Application No. 60/643,029 filed Jan. 11, 2005, entitled "Multiple User Desktop Graphical Identification and Authentication". The prior application is hereby incorporated into this application by reference as if fully set forth herein.

This patent application is also related to Provisional Patent Application No. 60/653,249 filed Feb. 15, 2005, entitled "Software Authentication Facility," and is related to Provisional Patent Application No. 60/653,250 filed Feb. 15, 2005, entitled "Software Messaging Facility System".

BACKGROUND OF THE INVENTION

1. Field of the Invention

The present invention relates to a method and system for computer workstation security, and more particularly, to a graphical identification and authentication system for multiple user access to a computer workstation or computer network access point. The present invention has particular application to computers which are shared by multiple users or to computers and computer network access points which are in an unsecured or public location, and for single users having multiple logon accounts or other secured access requirements for multiple computer applications, databases, networks, and the like.

2. Description of the Prior Art

Currently, it is possible for multiple users to logon to the same system simultaneously but this is presently limited to what is currently the most recent version of the Microsoft Windows® Desktop Operating System (Windows XP) and it is disabled if the system is joined to a network domain. Most businesses utilize their computers as part of a network domain, and many businesses are not running Microsoft Windows XP on all their workstations. In either of these situations, there is only one way to address the problem of maintaining secure, audited secure resource access on a shared workstation; that is to require each user to perform a logon to the system, access the secure resources and then logoff. This process can be cumbersome and time consuming as it requires that a user always remember to close out their applications and logoff when they are finished with the system. Even worse, if a user forgets to logoff, the system and the secure resources can be compromised by anyone who may have physical access to the terminal or system. Even if proper security is put in place, such as a short timeout before a screen lock, problems may still occur. For instance, if the system goes into the locked state either by user intervention or by inactivity and another user with insufficient privilege to unlock the system needs access, there is no way that user can unlock the system. Another significant issue is the time it takes to logon to system and then logon to the applications required to access the secure resources. Since a user must logoff the system whenever they are finished using it, they must also go through the logon process each time the want to access it, resulting in severely diminished productivity of the shared resources. This is problematical and inefficient for the user, system, network and any application servers. This is especially inefficient in cases where repeated intermittent use of secure resources is needed by a single or by a mix of multiple users.

An alternative approach sometimes used is to create a single "generic" account for all users to log in with. However, due to new regulations and increased security concerns, it is no longer practical, and in some cases no longer legal, to allow multiple users to log on to a system using the same generic account. Using a generic account makes it almost impossible to know by whom, when and where sensitive data is accessed. Furthermore, generic account methods lack audit trail capability.

SUMMARY OF THE INVENTION

The present invention is a multiple user desktop (MUD) graphical identification and authentication (GINA) system that is intended to be used as a full replacement GINA system on computer workstations that are shared by more than one user. The present invention has particular utility for computers running Microsoft Windows 2000 and Microsoft Windows XP operating systems and related operating systems (including any based on the Windows NT operating system). These operating systems do not have the same functionality as the present invention. The MUD GINA is intended for shared computers used in businesses, kiosks, homes, nursing stations and anywhere more than one user utilizes the same computer. Along with shared computers, the MUD GINA can also be utilized by a single user who needs to logon to their computer using more than one logon account. The MUD GINA is also useful for situations such as with multiple email accounts or for launching specific applications needing special credentials. The MUD GINA is also useful in cases where repeated intermittent use of secure resources is needed by a single or by a mix of multiple users. For example, one or more users who needs to briefly access inventory or ordering systems and then walks away to retrieve an item or assist a customer, and then the same or another user again needs to access inventory or ordering systems, and so forth.

The MUD GINA of the present invention is also intended for use by individuals and businesses that need to limit access to secured resources because of corporate security concerns and procedures, or government regulations (e.g., HIPAA). Use of the MUD GINA addresses these issues by allowing multiple users to simultaneously log on to a shared system using their own unique credentials. In this way, a record can be made of which users log on, and when each user logs on and off. By tracking the unique User credentials, the MUD GINA addresses audit requirements for what information they may have accessed.

The invention comprises a MUD GINA Dynamic Link Library (DLL) which is designed to run on computers running Microsoft Windows operating systems that are based on the Windows 32-bit NT operating system. These Windows operating systems include the Winlogon.exe application which loads users' profiles, runs policies, and starts the user's shell. A default Microsoft GINA is responsible for authenticating the user who is attempting to logon to the Windows NT based system. If the user authenticates successfully, then the GINA informs Winlogon that the user is valid, and the process of creating an interactive desktop is performed. (If the user is not valid, the GINA returns a failure to Winlogon and the system remains locked.) Winlogon is specifically designed to allow only a single user to logon to a system at any time with only a single interactive logon session. Since Winlogon can only deal with what amounts to a single logged on user at a time, the MUD GINA of the present invention utilizes a "dummy" user which remains logged into the system; the dummy user is created the first user performs a logon. The multiple user desktop of the present invention does all the work of creating the interactive logon session and the graphical desktop, executes the profiles, runs the policies and starts the user's shell. Since Winlogon is expecting to do this, the MUD sends back a "dummy" user which in this case is the "system" user (a user known to always be present on every system). The MUD of the present invention performs GINA functions for multiple users, allowing one or multiple users to logon, temporarily lock the system, unlock the system, logoff, in a flexible manner, while Winlogon thinks the dummy user remains logged on. Therefore, the MUD GINA of the present invention provides the security functions once Winlogon has authenticated the dummy user created when the first user logged on. When all users have logged off (not simply locked the system temporarily) via the MUD GINA, Winlogon can logout the dummy user. In this way, the present invention overcomes the prior art problems and provides for efficient security for multiple user and intermittent users, authenticated access to computers, kiosks, network access points, network resources, databases, applications, and the like.

Some embodiments of the present invention provide for up to 13 concurrent users. Other embodiments of the present invention are not limited to the number of concurrent users, provided the computing resources are adequate to maintain a sufficient number of desktops and running applications.

As examples, and not by way of limitation, additional information regarding illustrative embodiments of the present invention can be found in the Single Private Desktop GINA User's Manual, the Multiple Private Desktops GINA User's Manual, the Software Specification for Single Private Desktop version 1.1, and the Software Specification for Multiple Private Desktops version 1.0 which are available from Sig-Tec Corporation and are incorporated herein by reference.

One significant aspect and feature of the present invention is a replacement user authentication program for use in a Microsoft Windows operating environment.

Another significant aspect and feature of the present invention is secure access for intermittent users of computer resources.

Still another significant aspect and feature of the present invention is secure access for multiple users of computer resources.

Yet another significant aspect and feature of the present invention is compatibility with 32-bit Windows NT based operating systems.

A further significant aspect and feature of the present invention is enhanced security for "safe mode" hacks.

A still further significant aspect and feature of the present invention is real security for multiple desktops rather than insecure hiding of alternate desktops.

Having thus described embodiments and significant aspects and features of the present invention, it is the principal object of the present invention to provide a secure multiple user environment on a single desktop personal computer, having the ability to have multiple users logged in simultaneously without exiting or closing open programs.

One object of the present invention is to provide enhanced security to comply with business or legal requirements.

Another object of the present invention is to enhance efficiency by providing improved security without the need for repeated application shut-down/logoff/application restart/logon sequences.

Yet another object of the present invention is to provide enhanced security in an intermittent use or multiple user environment with a graphical interface which is familiar to users.

Still another object of the present invention is to provide enhanced tracking of user logon and activity.

A further object of the present invention is to provide enhanced and efficient security on computers running Windows NT 4.0, Windows 2000, Windows XP, and related operating systems.

A still further object of the present invention is to provide controlled and safe logout and shutdown of secure computers.

An additional object of the present invention is to provide enhanced security in domain, network, and non-network environments.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 1 illustrates the alignment of FIGS. 2a, 2b, 2c and 2d to one another, of FIGS. 3a, 3b, 3c and 3d to one another, of FIGS. 4a, 4b, 4c and 4d to one another, of FIGS. 5a, 5b, 5c and 5d to one another, of FIGS. 6a, 6b, 6c and 6d to one another, and of FIGS. 7a, 7b, 7c and 7d to one another;

FIGS. 2a, 2b, 2c and 2d, in combination, are a flowchart illustrating one embodiment of the present invention, showing the workstation boot sequence and logic;

FIGS. 4a, 4b, 4c and 4d, in combination, are a flowchart illustrating another embodiment of the present invention, showing the workstation boot sequence and logic;

FIGS. 5a, 5b, 5c and 5d, in combination, are a flowchart illustrating the embodiment of FIGS. 4a, 4d, 4c and 4d, showing the initial logon sequence and logic;

FIGS. 6a, 6b, 6c and 6d, in combination, are a flowchart illustrating the embodiment of FIGS. 4a, 4b, 4c and 4d and FIGS. 5a, 5b, 5c and 5d, showing the sequence and logic for a logged on user; and, FIGS. 7a, 7b, 7c and 7d, in combination, are a flowchart illustrating the embodiment of FIGS. 4a, 4b, 4c and 4d, FIGS. 5a, 5b, 5c and 5d, and FIGS. 6a, 6b, 6c and 6d, each in combination, showing the sequence and logic for the workstation unlock and login sequence.

DETAILED DESCRIPTION OF THE PREFERRED EMBODIMENTS

Figure 2A:
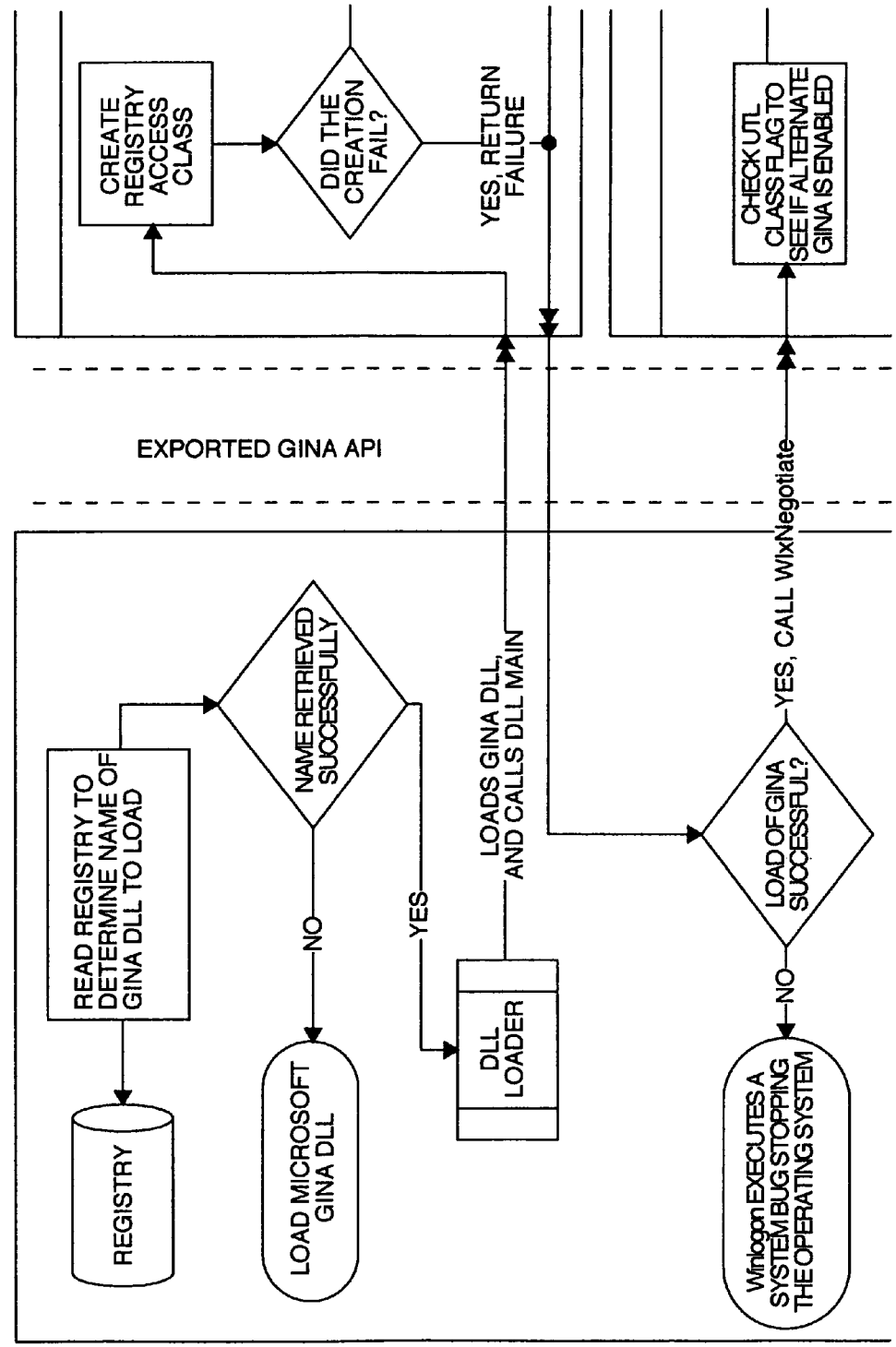
Figure 2C:
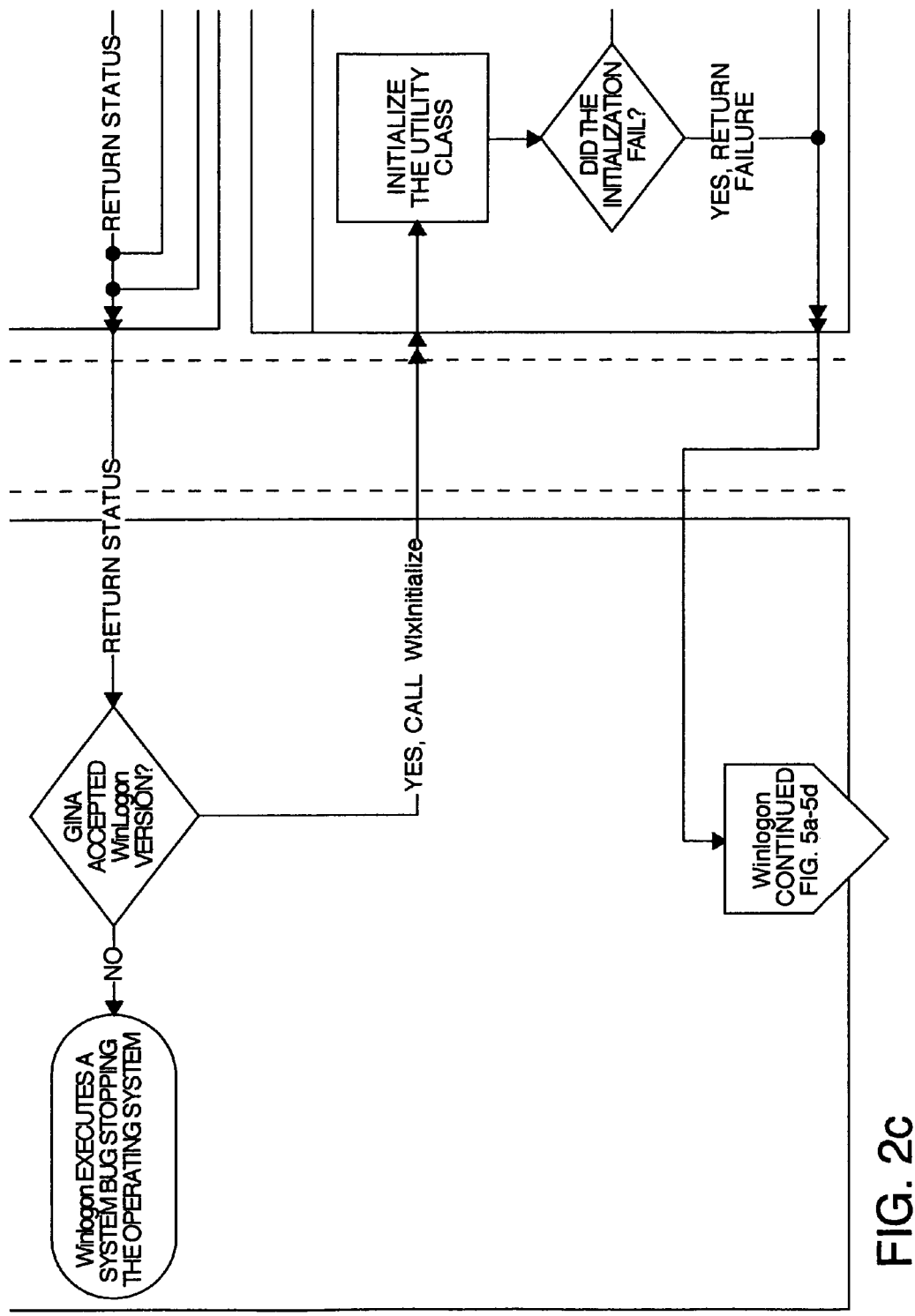
Figure 2D:
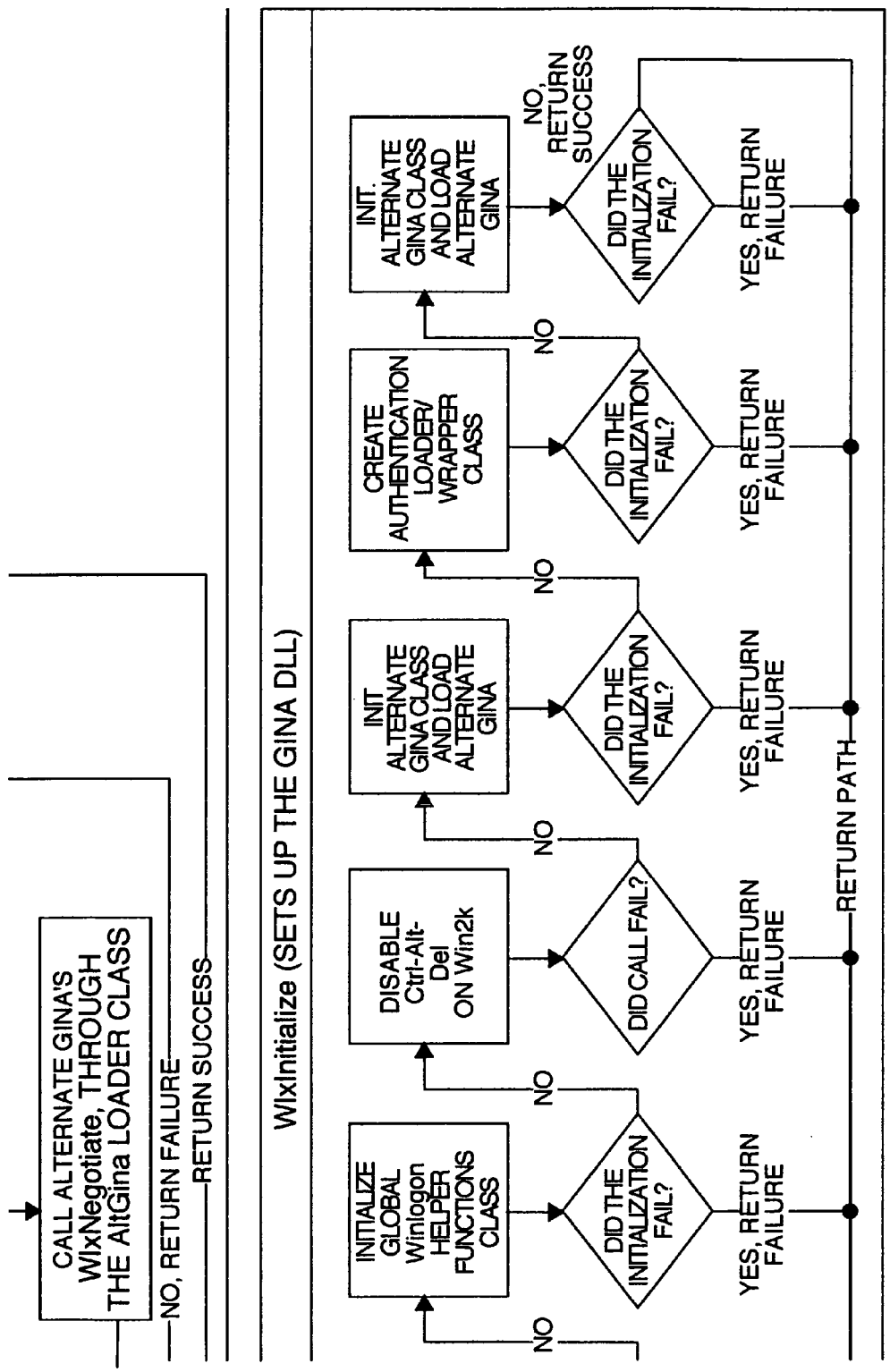
Figure 3A:
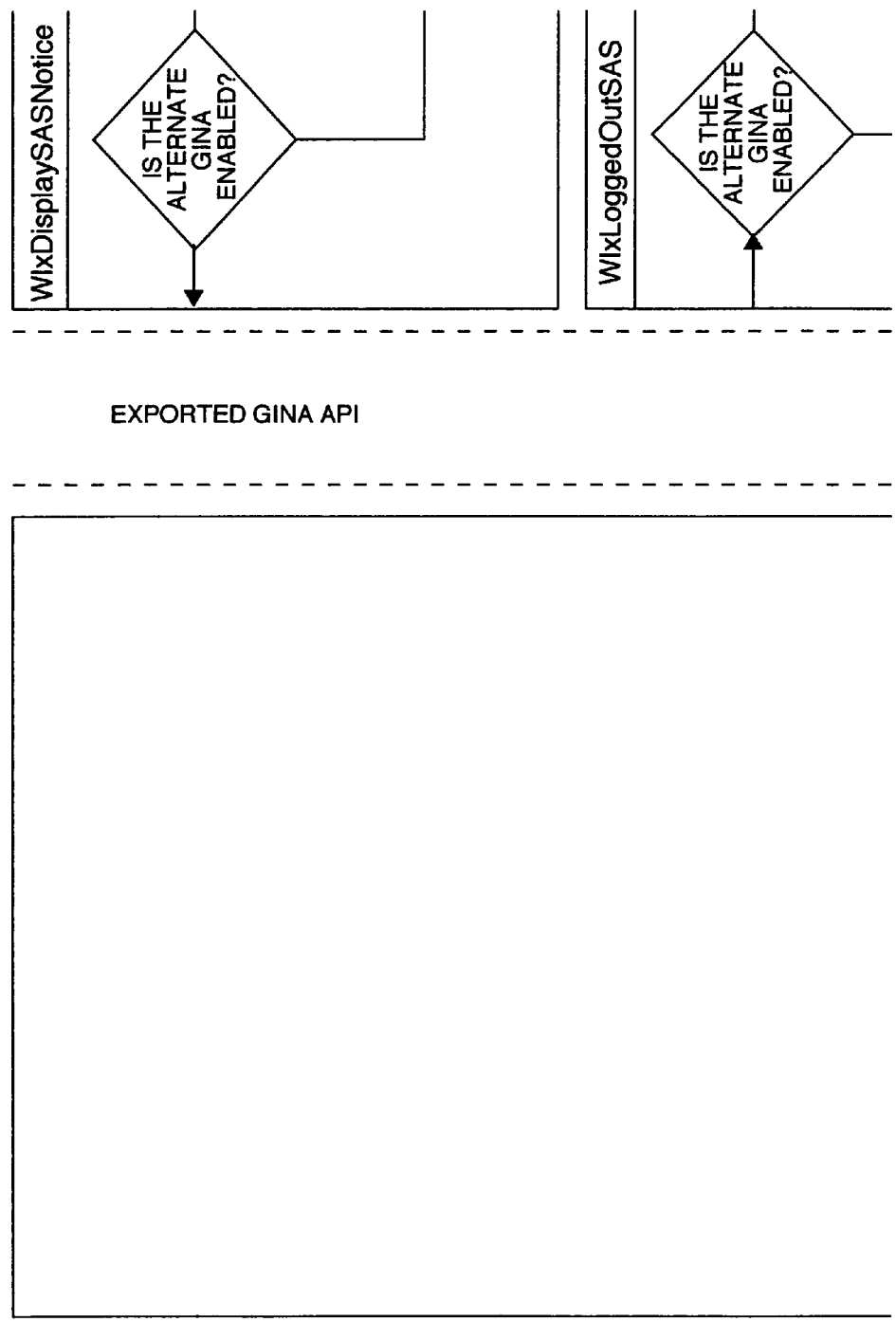
FIGS. 3a, 3b, 3c and 3d, in combination, are a flowchart illustrating the embodiment of FIGS. 2a, 2b, 2c and 2d, showing the initial logon sequence and logic.
Figure 3B:
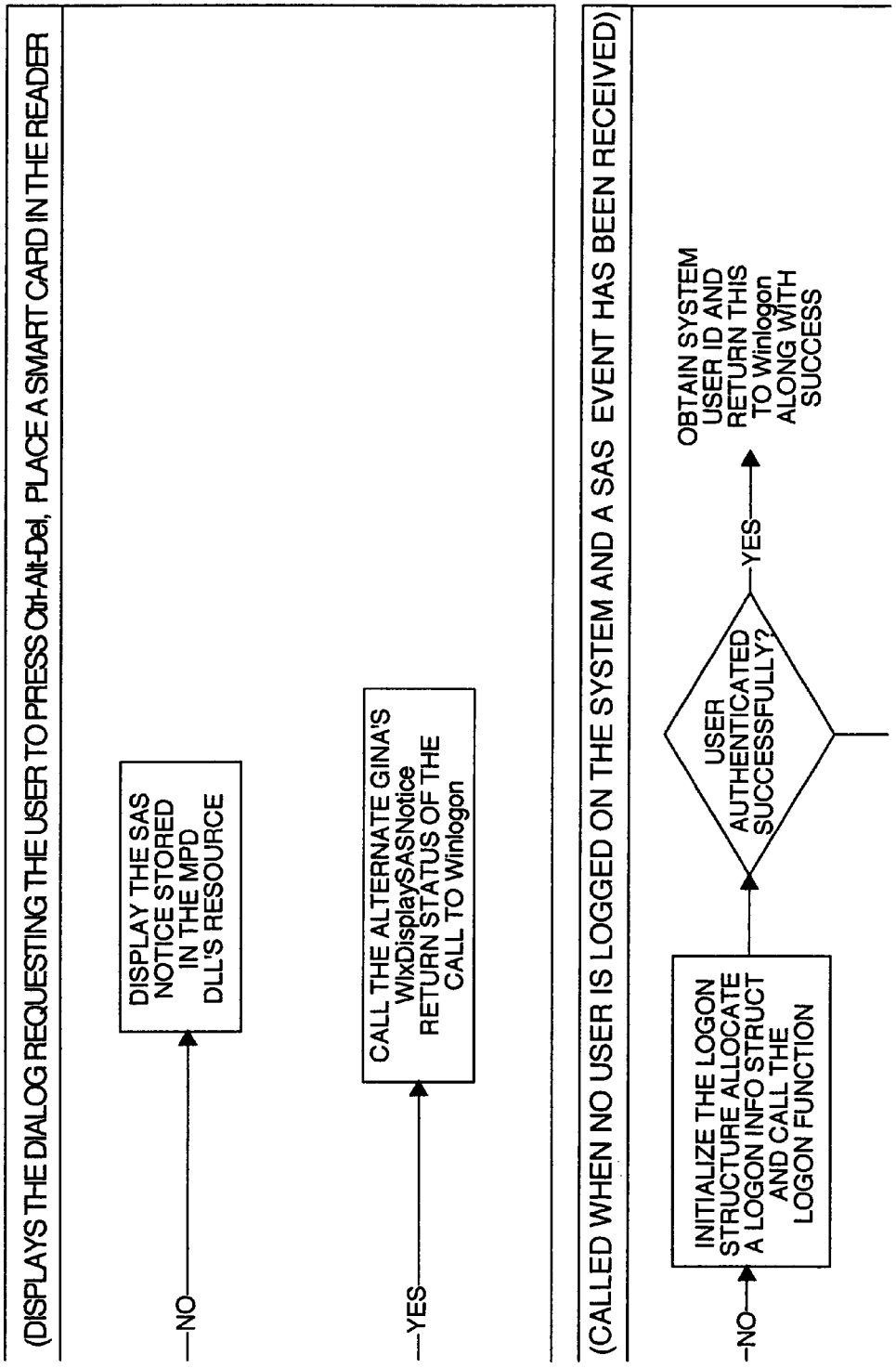
Figure 3C:
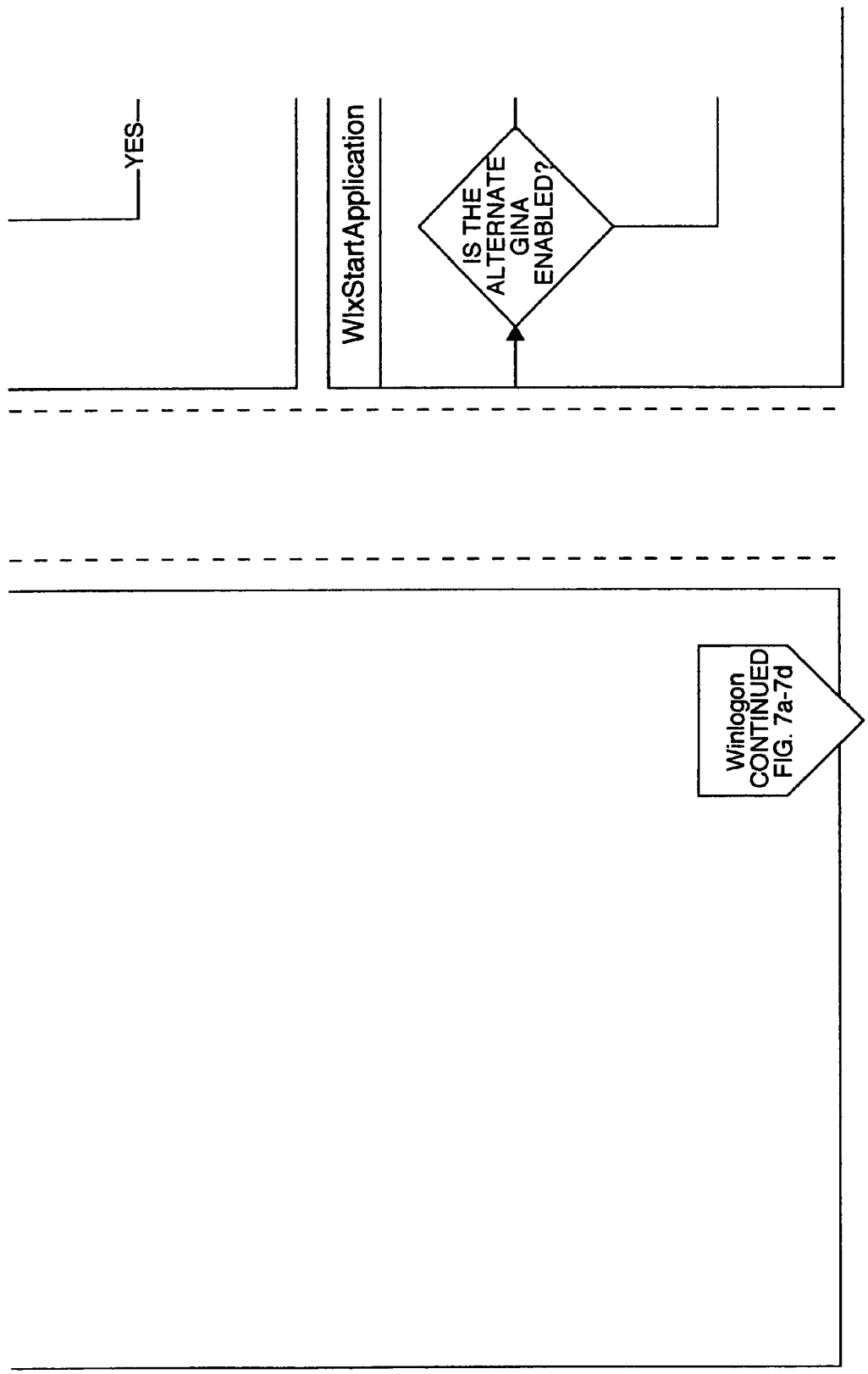
Figure 3D:
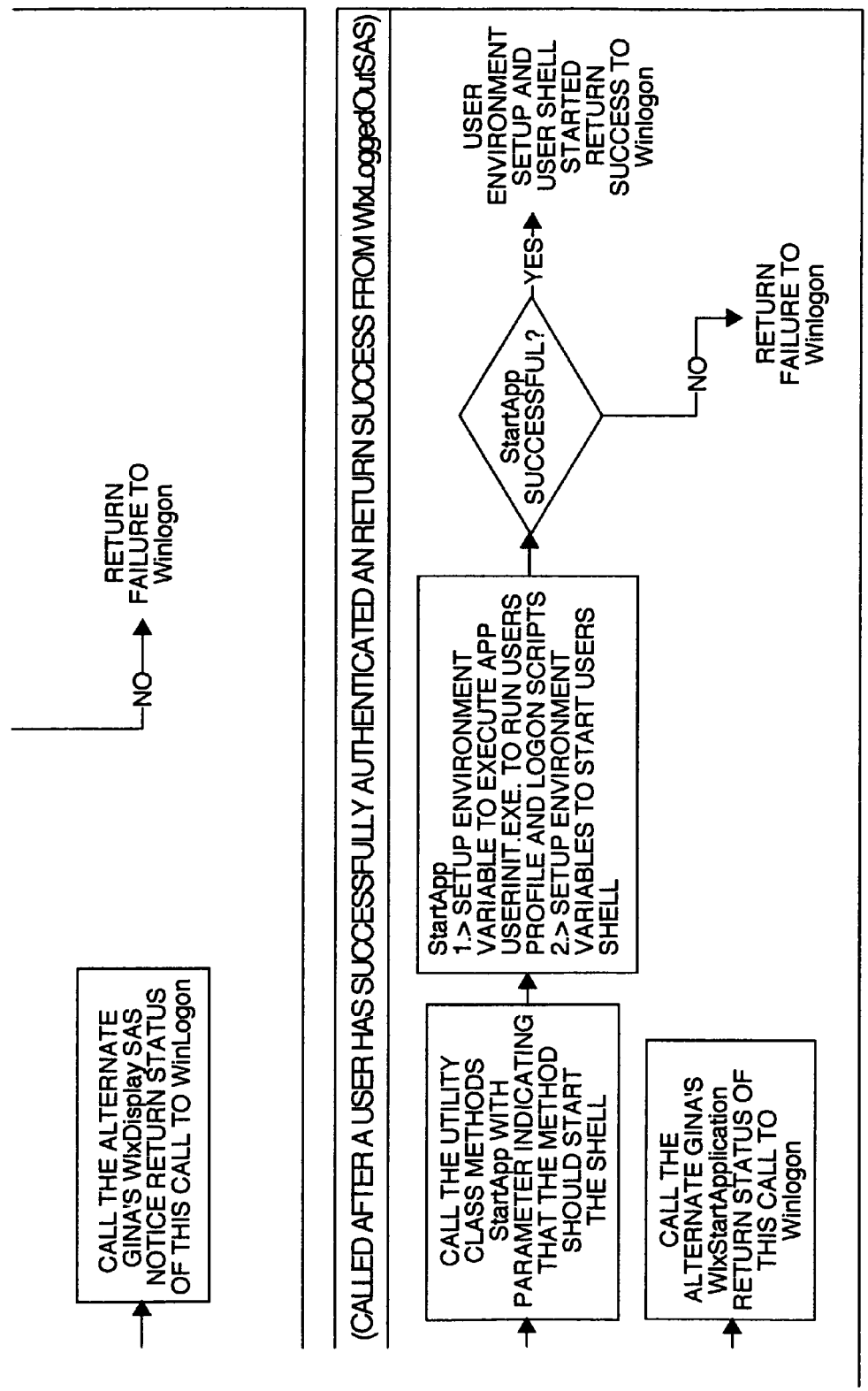
Figure 4A:
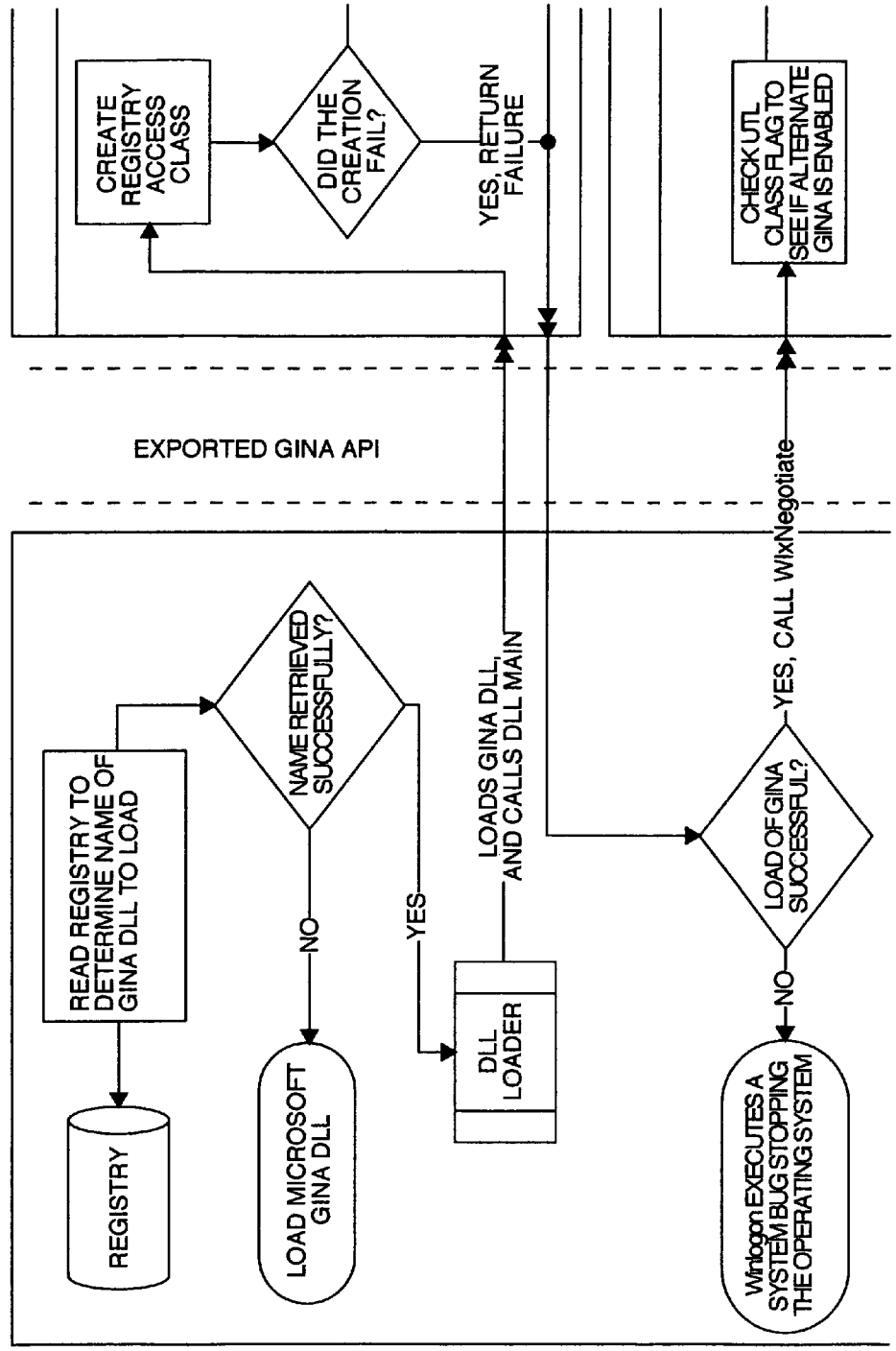
Figure 4C:
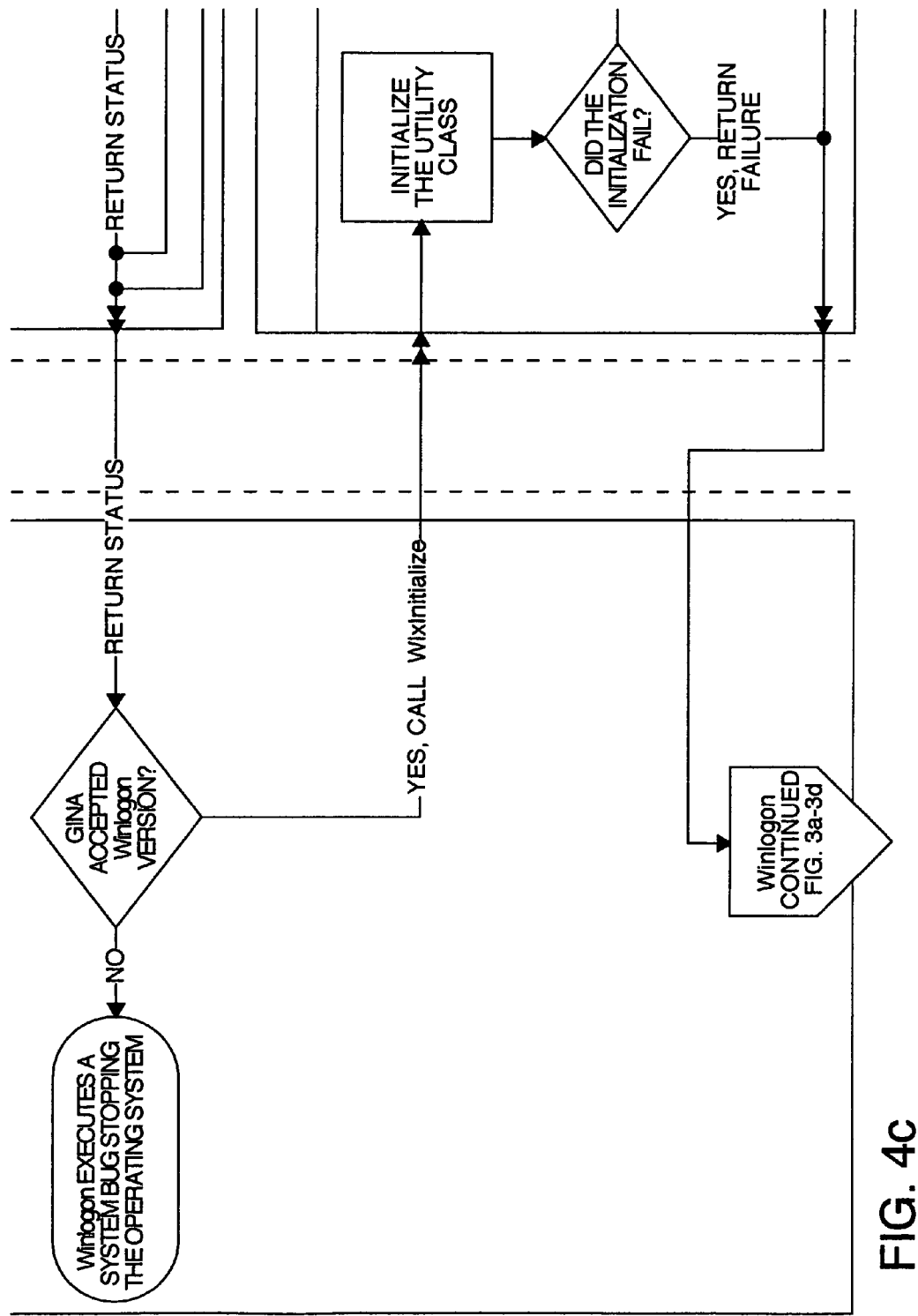
Figure 4D:
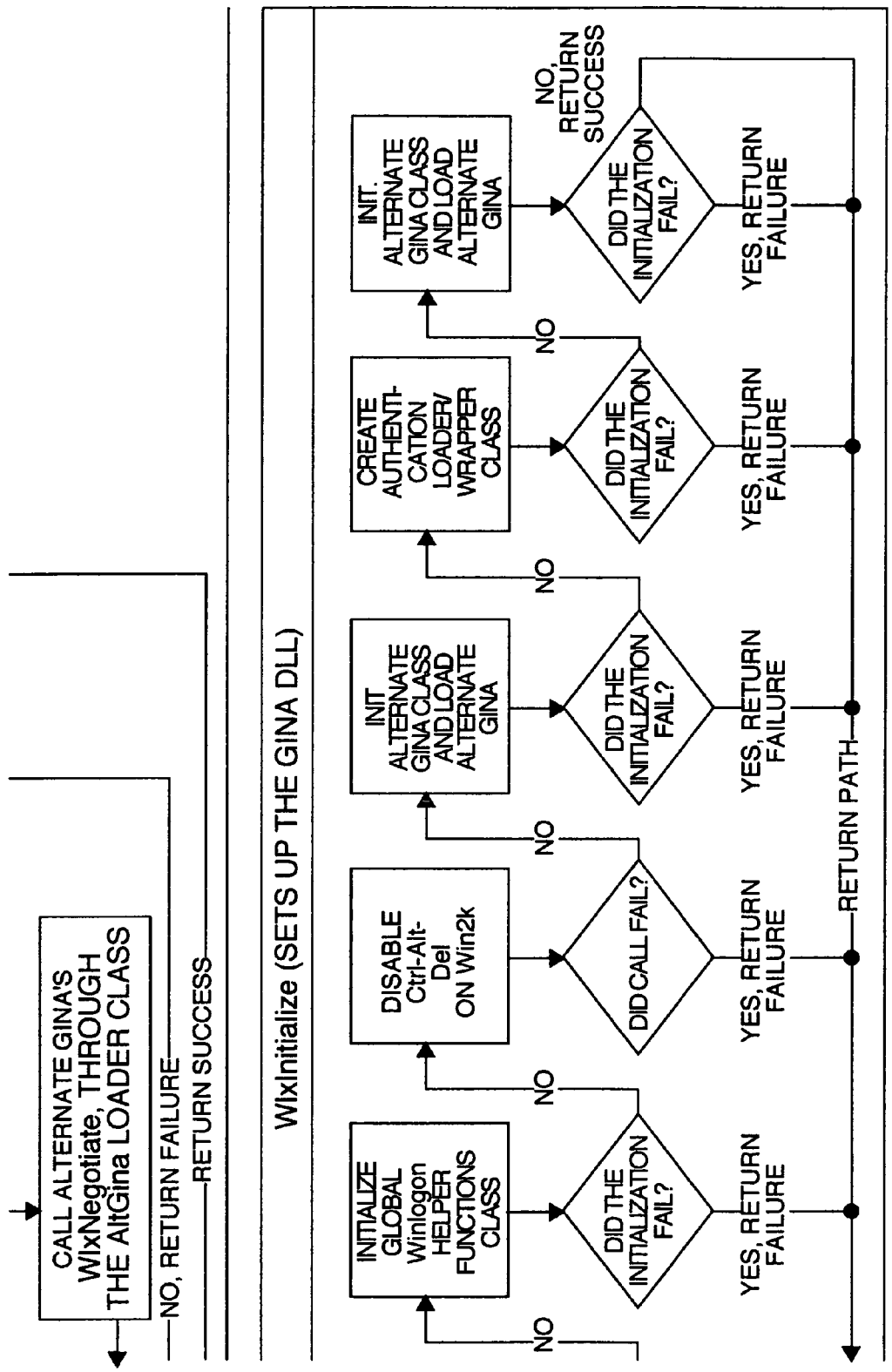
Figure 5B:
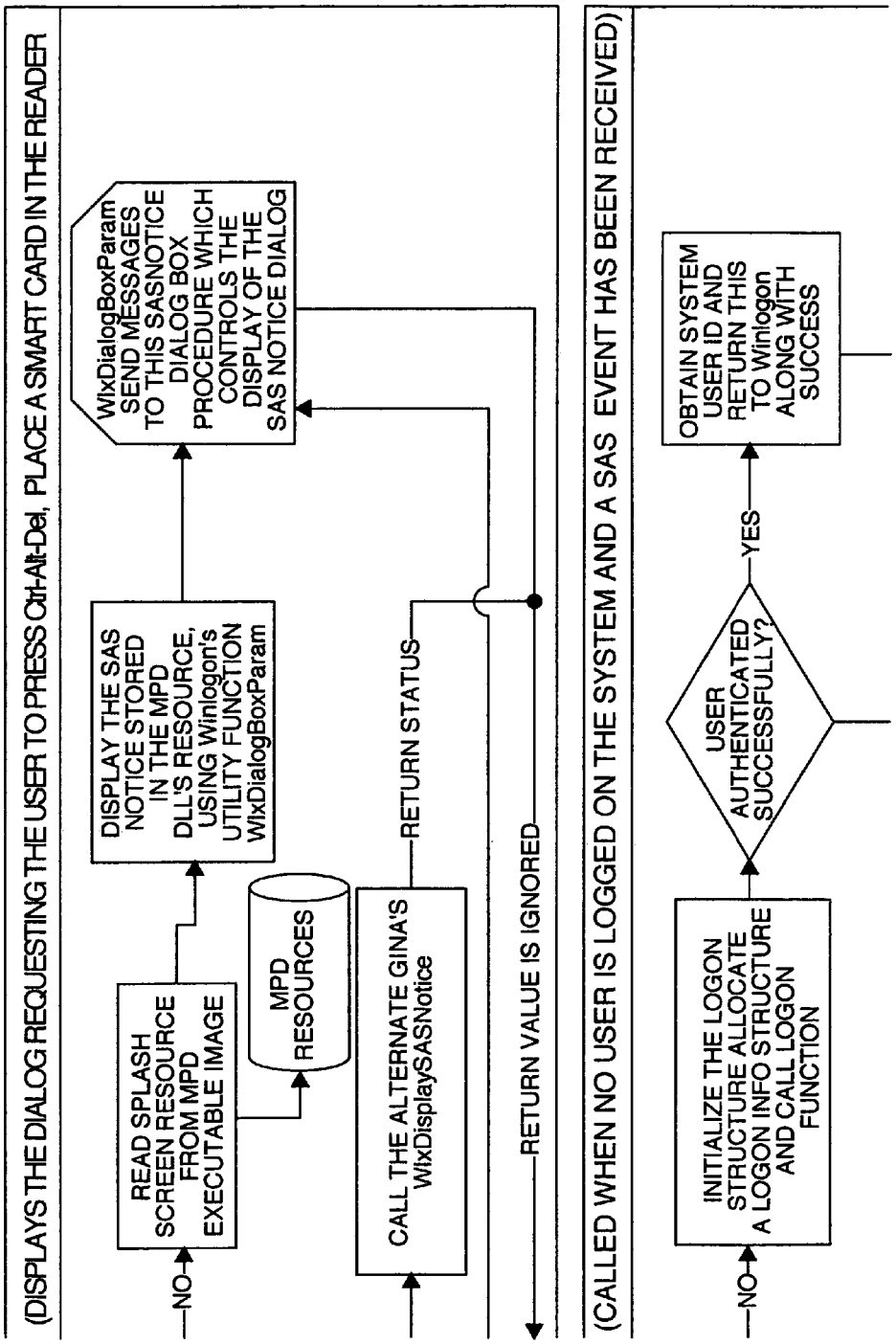
Figure 5C:
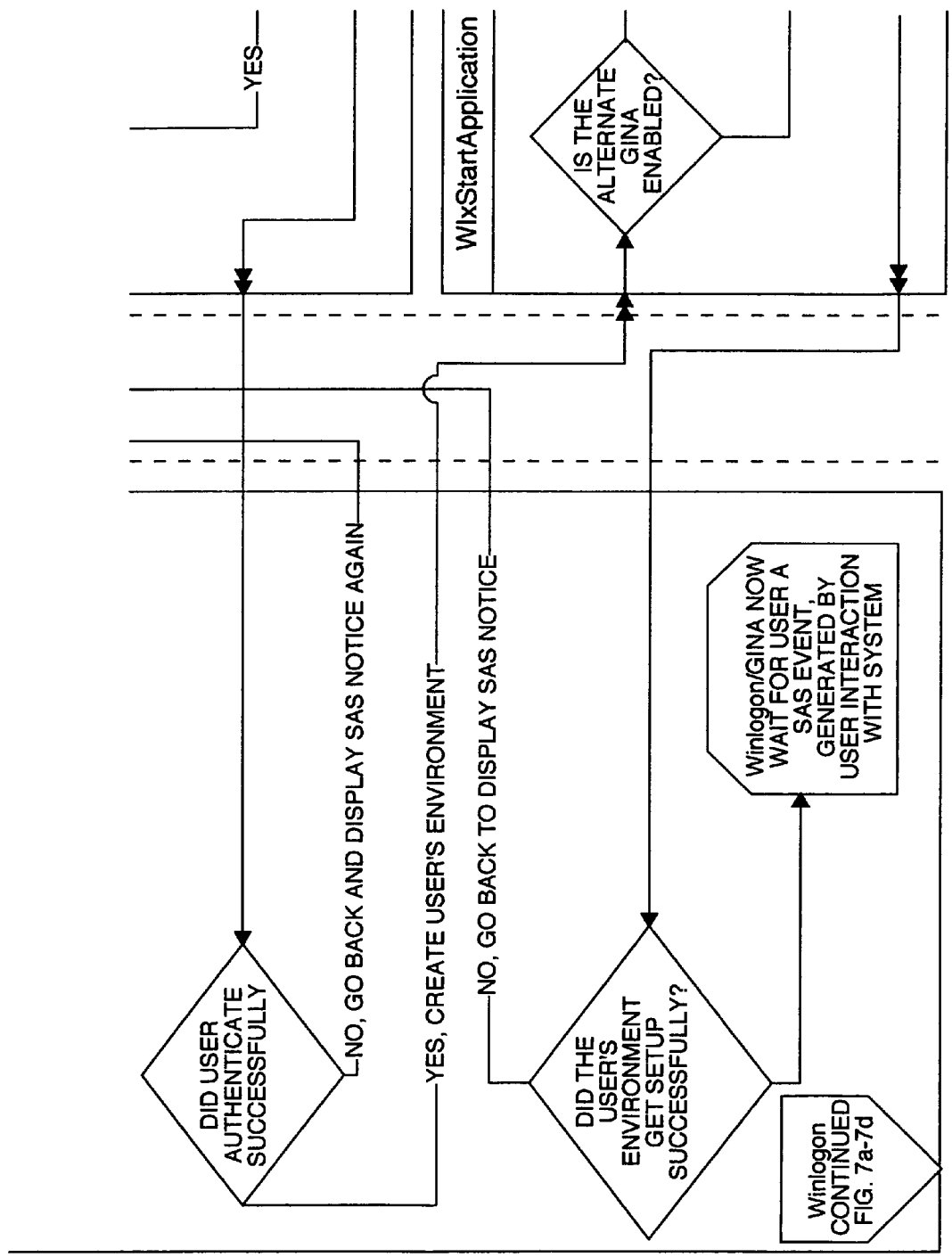
Figure 5D:
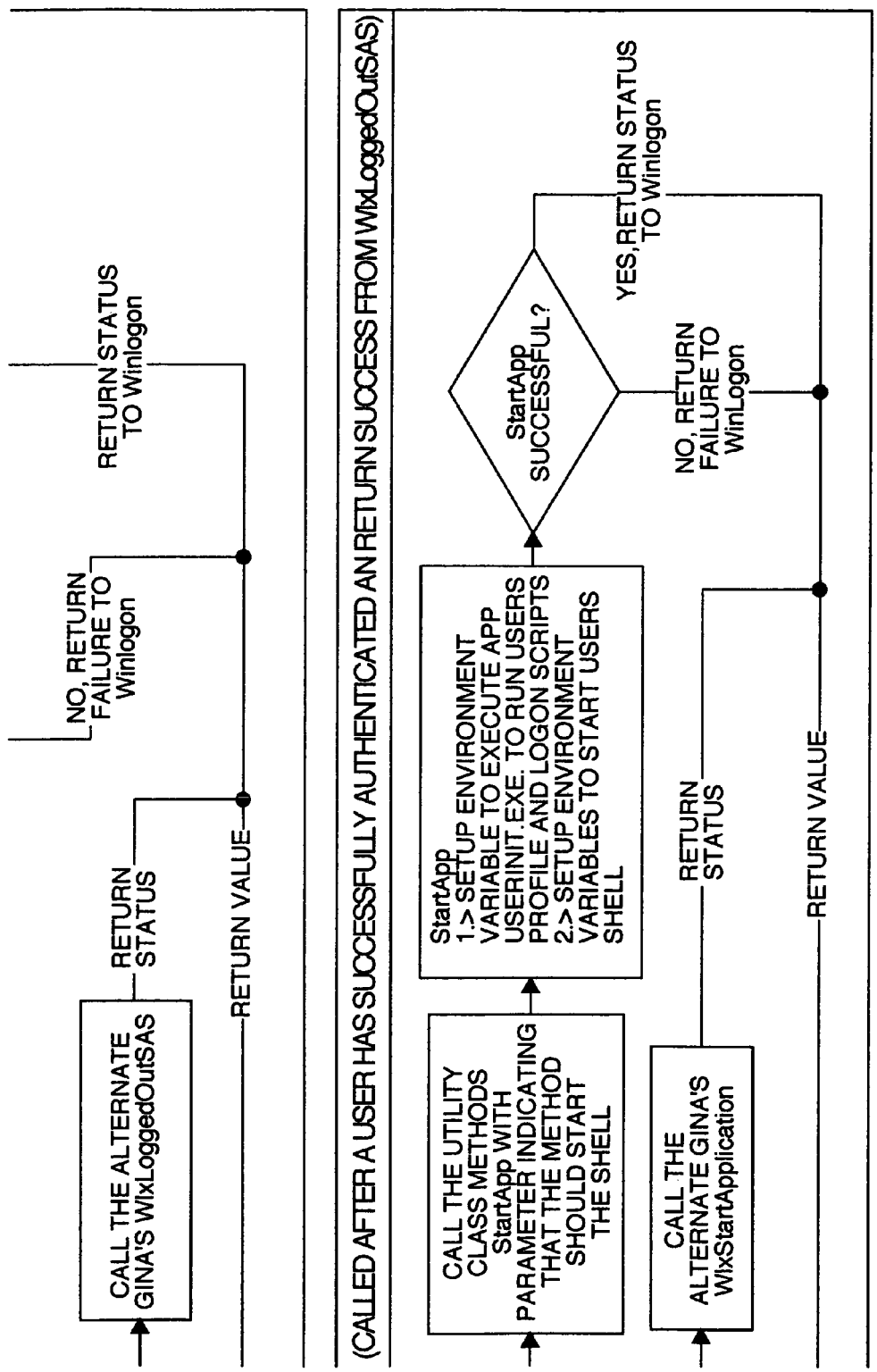
Figure 6B:
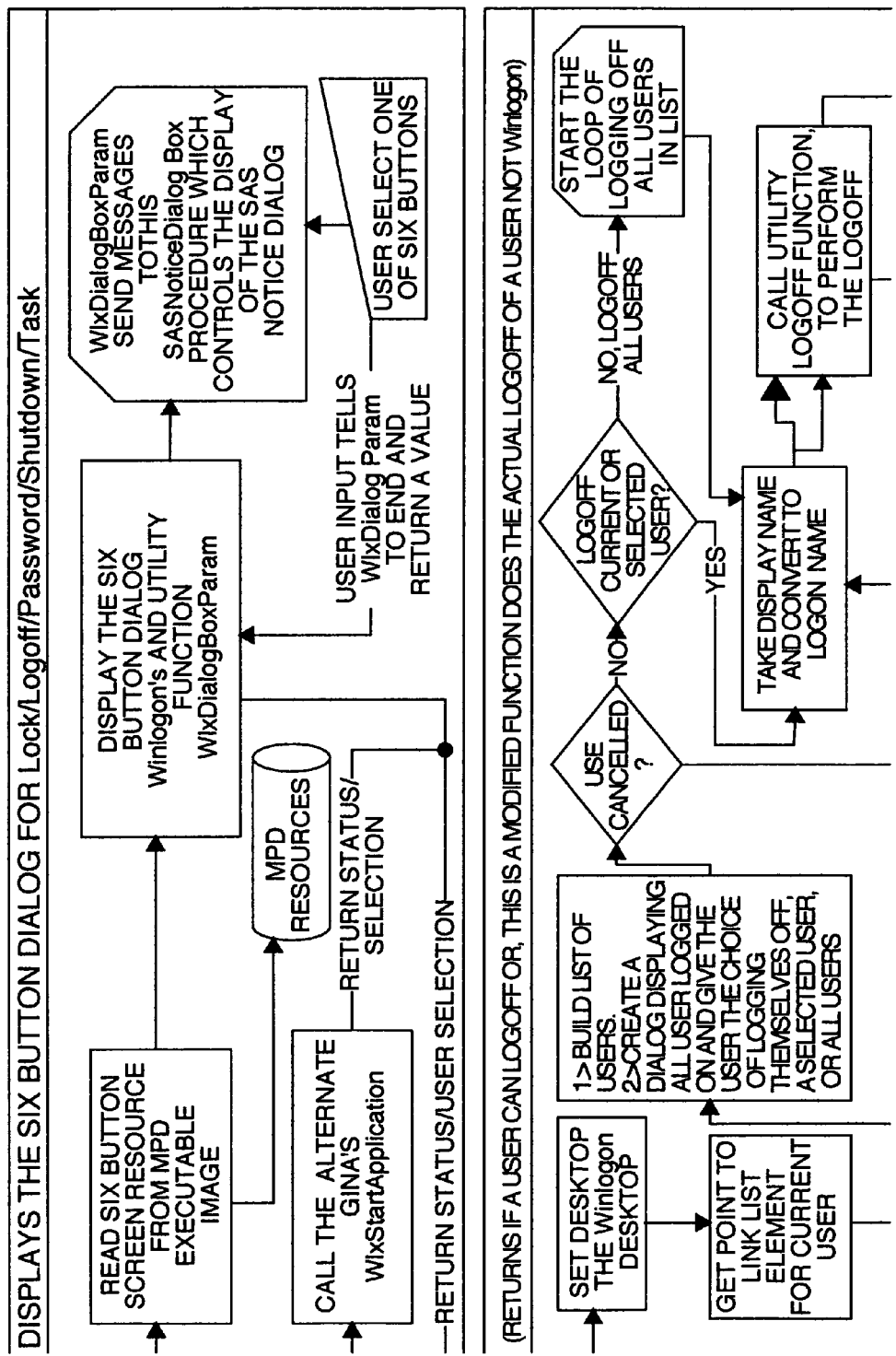
Figure 6C:
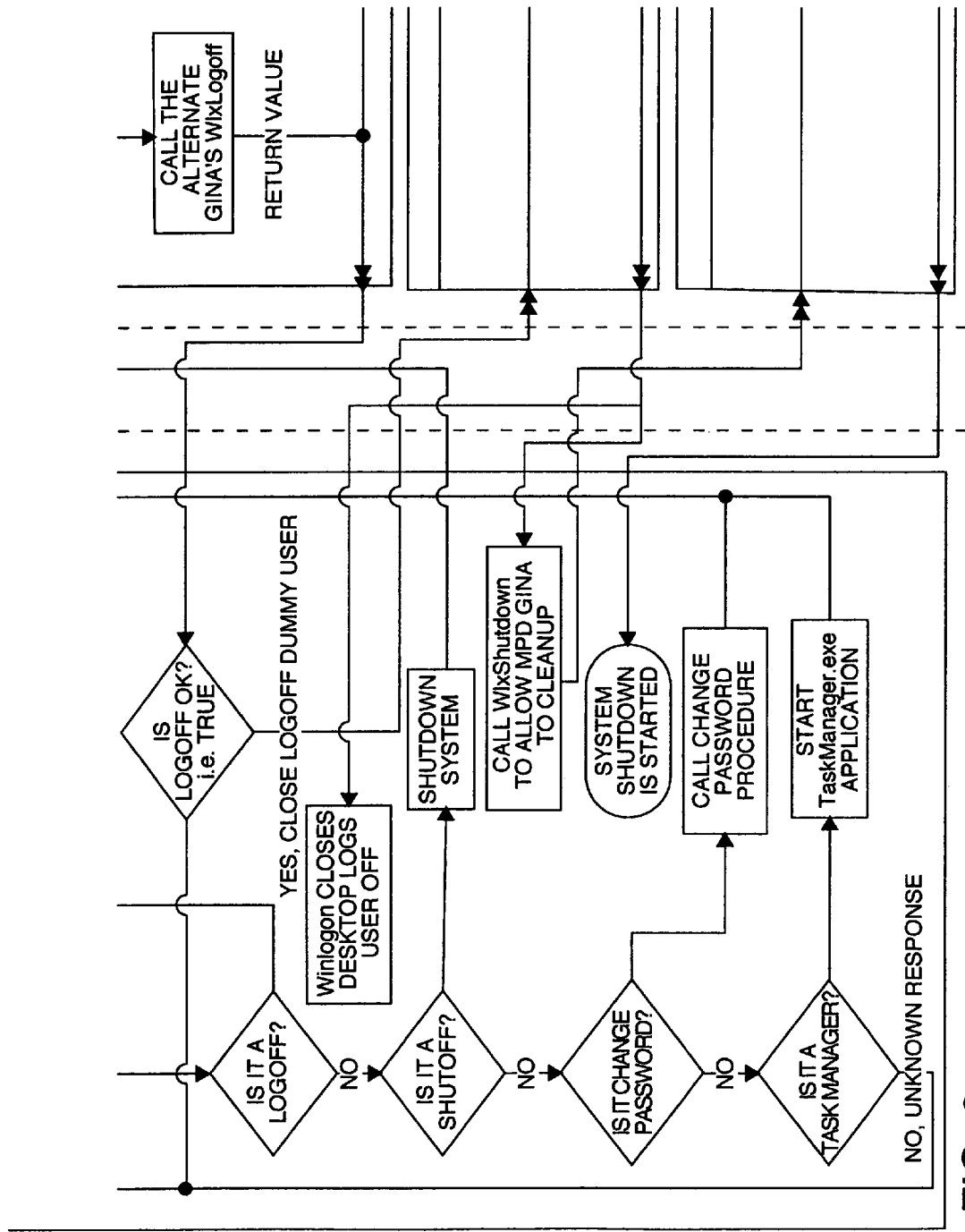
Figure 6D:
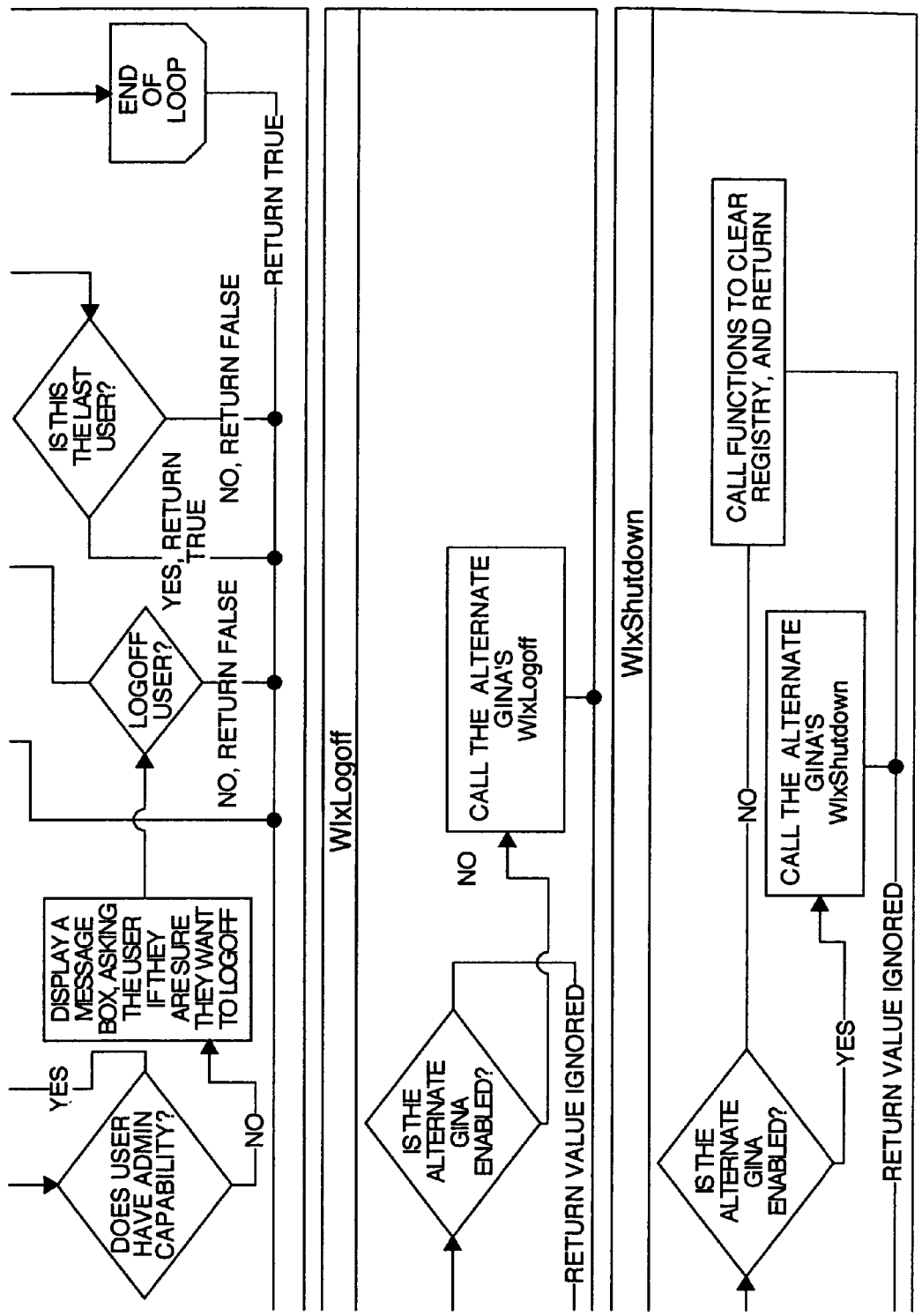
Figure 7A:
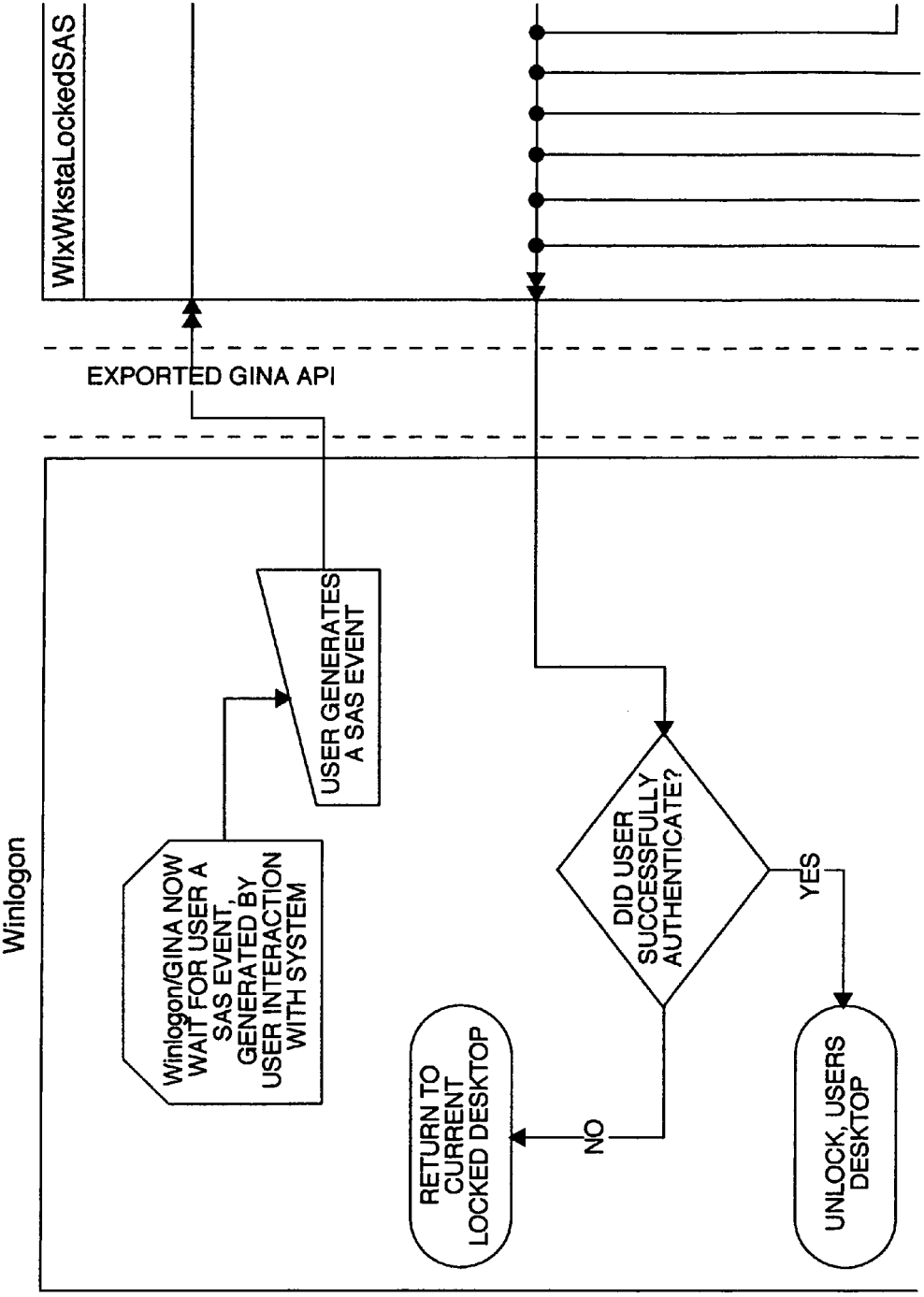
Figure 7C:
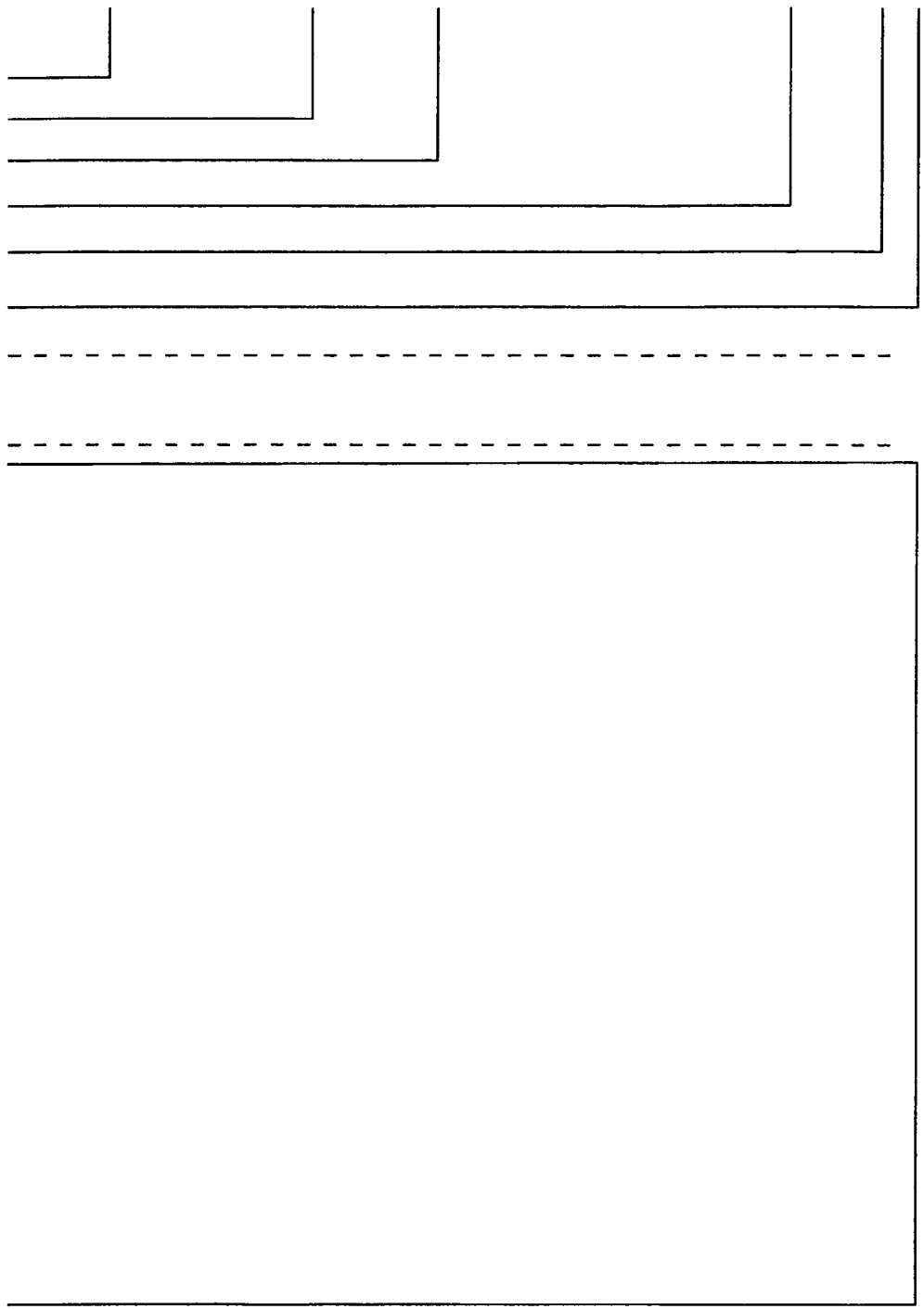
Figure 7D:
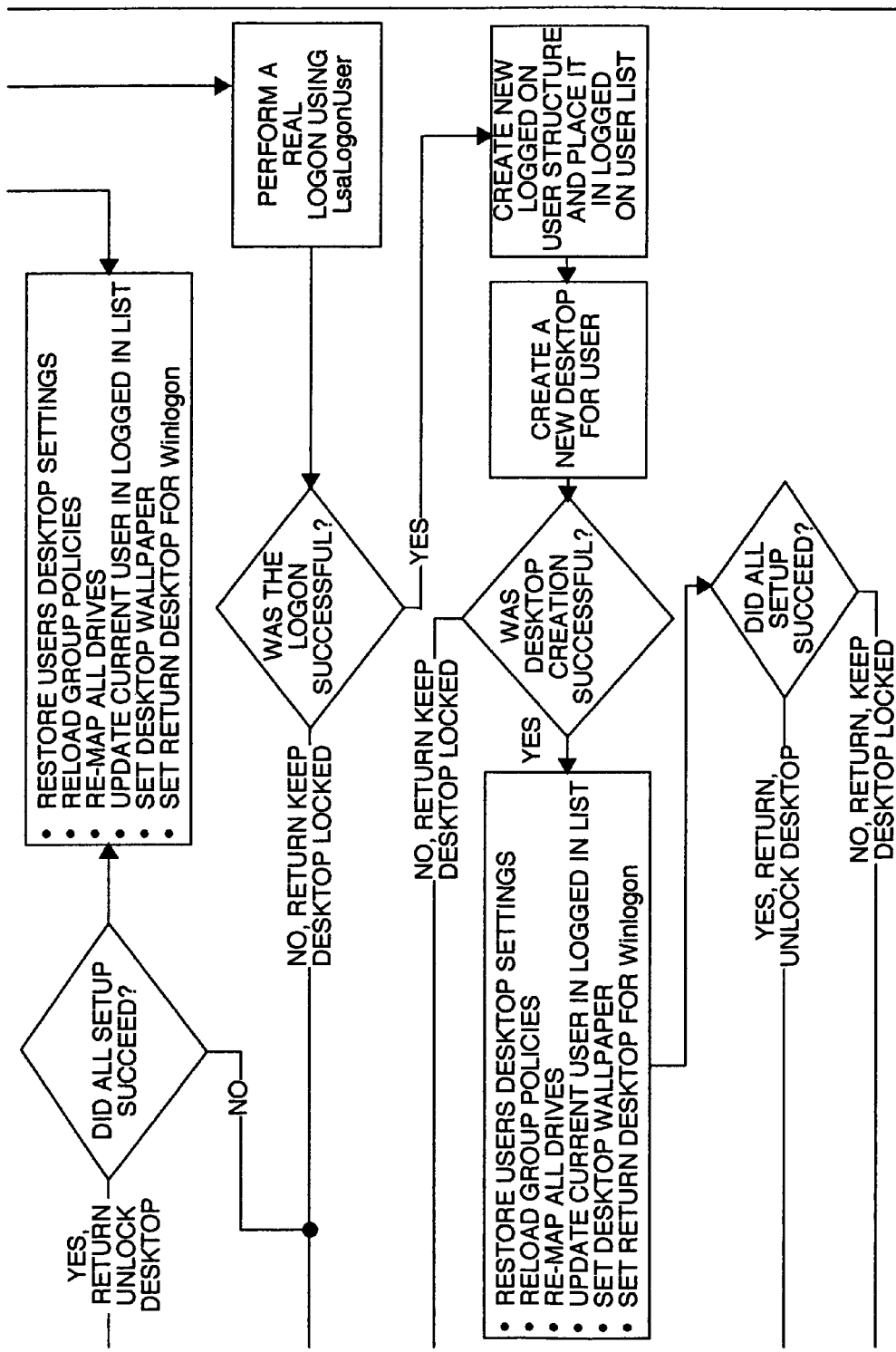

FIGS. 2a, 2b, 2c and 2d; FIGS. 3a, 3b, 3c and 3d; FIGS. 4a, 4b, 4c and 4d; FIGS. 5a, 5b, 5c and 5d; FIGS. 6a, 6b, 6c and 6d; and FIGS. 7a, 7b, 7c and 7d, each in combination throughout, illustrate in flowchart form the principal sequences and logical decisions of the present invention. These figures represent examples of embodiments of the present invention. The sequences illustrated in the figures can be utilized in subunits such as are grouped on separate figures (or even portions of the separate figures). Preferably, however, the subunits are connected so that the various figures, such as FIGS. 4a, 4b, 4c and 4d; FIGS. 5a, 5b, 5c and 5d; FIGS. 6a, 6b, 6c and 6d; and FIGS. 7a, 7b, 7c and 7d, are continuations within an overall sequence and logic path for the MUD GINA as a whole. As illustrated in the figures, certain elements in the flowcharts connect or pass to elements in other of the flowcharts. Thus, the sequence for workstation boot of FIGS. 4a, 4b, 4c and 4d may be followed by the sequence for initial logon of FIGS. 5a, 5b, 5c and 5d, which in turn may be followed by the sequence for a logged on user of FIGS. 6a, 6b, 6c and 6d, which in turn may be followed by the sequence for user unlock/login of FIGS. 7a, 7b, 7c and 7d, which in turn may be followed by the sequence for initial logon (for another user), followed by the sequence for a logged on user of FIGS. 6a, 6b, 6c and 6d, and so forth. The logoff and shutdown sequence illustrated by a portion of FIGS. 6a, 6b, 6c and 6d is utilized one or more times as desired to logoff each user and shut down the system. In the figures, the acronym MPD refers to a particular product name "Multiple Private Desktop" but the figures are intended to be interpreted more generally to include MUD, multiple user desktop as described herein, and to include the enhanced security features and more efficient logon/logoff processes disclosed herein even if only for a single user (such as the SPD or "Single Private Desktop" product).

The present invention provides methods and means for secure access to computer resources (computers, workstations, servers, networks, operating systems, applications, databases, computer files, and computer-based data and information). The present invention includes methods of providing graphical identification and authentication, including methods for intermittent logon, and methods for multiple user logon. The present invention also includes software which provides means of performing graphical identification and authentication, including means for intermittent logon, and means for multiple user logon. The present invention methods and software provide enhanced security, usability, and efficiency over prior art methods and software.

In a preferred embodiment of the present invention, the MUD GINA comprises a MUD GINA Dynamic Link Library (DLL). The MUD GINA Dynamic Link Library is designed to run on Microsoft Windows operating Systems that are based on, or derived from, the 32-bit Windows NT operating system. A DLL is a module that can be loaded by other modules or applications to add functionality or perform a service. The MUD GINA Dynamic Link Library module is intended to be loaded by the Microsoft Winlogon.exe application which is responsible for the creation of desktops, loading users' profiles, running policies and starting the user's shell. A graphical identification and authentication is responsible for authenticating the user who is attempting to logon to the Windows NT based system. If the user authenticates successfully, then the graphical identification and authentication informs Winlogon that the user is valid and the process of creating an interactive desktop is performed. If the user is not valid the graphical identification and authentication returns a failure to Winlogon and the system remains locked, and may display the locked or logged out screen.

Winlogon is specifically designed to allow only a single user to logon to a system at any time. Winlogon is not designed to handle more than one interactive logon session. Because of Winlogon's inability to deal with more than one interactive logon session the multiple user desktop graphical identification and authentication of the present invention was created. The appearance of the MUD GINA of the present invention closely resembles Winlogon. The MUD GINA of the present invention is performs most of the functions of Winlogon so that the MUD GINA of the present invention can create more than one interactive desktop at a time. The limitation on interactive desktops is a Winlogon limitation and not a limitation of the 32-bit Windows NT based operating systems. Since Winlogon can only deal with what amounts to a single logged on user at a time, the multiple user desktop graphical identification and authentication has to fool Winlogon into thinking that a "dummy" user remains logged into the system and this is done when the first user performs a logon.

The multiple user desktop creates the interactive logon session and the interactive graphical desktop, executes the profiles, runs the policies, and starts the user's shell. Since Winlogon is expecting to do this, the multiple user desktop sends back a "dummy" user which in this case is the "system" user (a user known to always be present on every system). This has to be done because if the multiple user desktop sent back the first user to Winlogon and then later logged him off it would create inconsistencies in Winlogon and cause it to stop functioning.

The whole interface and interaction is preferably designed to be match the appearance of Winlogon so that the user logons look the same as if they were being done by Winlogon itself. Other functions of Winlogon and any dialog boxes, etc., are preferably configured to appear similar to that of Winlogon also, so that everything appears familiar to the user(s). The unlock screen of the present MUD system is modified from the typical appearance with Winlogon, however. After a user "locks the screen" by executing a secure attention sequence (SAS) event (e.g., hitting Ctrl-Alt-Del) or it is locked because of inactivity, the user must unlock the system to continue to use it. This is where the multiple user desktop graphical identification and authentication functionality changes significantly from that of the standard Windows functionality. The Microsoft graphical identification and authentication is designed to only allow the user who locked the desktop/computer to subsequently unlock it. Additionally, the standard Windows functionality allows an administrator to log the user off which can be dangerous or disruptive, and can cause problems with applications.

After a secure attention sequence event is received the present multiple user desktop graphical identification and authentication allows the same user to unlock the screen just like the Microsoft graphical identification and authentication. A key and novel feature of the present invention, however, is that the multiple user desktop graphical identification and authentication of the present invention allows a new user to logon to the system at the locked screen. If a new user name is entered or a new smart card or token is placed in a reader on the system then the multiple user desktop graphical identification and authentication will allow this new user to logon to the system without necessarily logging off the previous user(s). This additional logon is accomplished by the present MUD by simply validating the credentials supplied by the user and then checking them against the currently logged on users to see if there is a match. If there is a match, then the appropriate desktop is set in Winlogon and a screen unlock message is returned to Winlogon; this can be much faster and more efficient than a full startup—login process which may be required for the first user/login. If the user is not found with valid credentials, then the multiple user desktop graphical identification and authentication assumes it is a new user and goes about the process of creating the interactive session and desktop, executing the profile, running the policies, and starting the shell, with the required authentication of user credentials.

At this point, the new desktop is set in Winlogon by a call to WlxSetuserDesktop and a value WLX_SAS_ACTION_WKSTA_UNLOCK is returned. Winlogon will unlock the workstation setting the desktop to the new user's desktop. When a user wishes to logoff the system, the functionality essentially is reversed, as follows. When the user selects Logoff, after a secure attention sequence event or from the start menu, multiple user desktop graphical identification and authentication is called to assist in the logoff and clean up after the user. If this is not the last user then multiple user desktop graphical identification and authentication closes the desktop and performs a logoff of the user and a cleanup of the user account data; a value of WLX_secure attention sequence_ACTION_WKSTA_LOCK is then returned to Winlogon as there is not a valid user desktop to display and the machine is left in a locked state.

In the event the user who wishes to logoff is the last user or the user has the privilege (such as administrator credentials) to perform a logoff of all the user things happen differently. Either the user's desktop is closed and the user is logged off or, if it is a logoff all users then all users are logged off one by one with each desktop being closed and the user is logged off and cleaned up. Once the logoff is/are completed, there are no users logged on so the "dummy" user can be freed up and sent back to Winlogon allowing it to perform its cleanup and logoff the system user. At this point, Winlogon sets its internal state to "logged out secure attention sequence" and displays the original splash screen. A shutdown or reboot will also force the logoff and closing of all desktops.

Preferably, but not always required, during this entire process there is a loosely coupled logging service (an application that runs on the system all the time from startup to shutdown) which is used for auditing purposes. It is an application that has an engine designed to process messages. The log messages come into a queue from the multiple user desktop graphical identification and authentication and are then passed to a process thread where they are "cracked" and the appropriate operations are performed on them. All log messages are sent to this logger to be outputted to a file or through a database layer to a specified database for viewing and auditing. This system is secure and provides for a detailed record of all activities performed by all individual users.

Mode of Operation

The multiple user desktop graphical identification and authentication is a computer program in the form of a dynamic link library. A dynamic-link library (DLL) is a module that contains functions and data that can be used by another module (application or DLL). It is intended to be run on Microsoft Windows Operating systems that are based on or derived from the 32-bit Windows NT architecture. The multiple user desktop graphical identification and authentication is basically a collection of functions that are made available to whoever loads it on the system. As a DLL, the multiple user desktop graphical identification and authentication can be used by another module and in this case the other module is an application called Winlogon.exe. Winlogon.exe handles interface functions that are independent of authentication policy. In the system, there are a required set of exported functions that the multiple user desktop graphical identification and authentication must make available to Winlogon.exe which in turn calls these functions based on its own internal "state". The purpose of Winlogon.exe is to create the desktops for the window station, implement timeout operations, and during its initialization pass a set of support functions to the graphical identification and authentication which it may use.

When the computer is started up and after the initialization of the hardware and the operating systems takes place the Winlogon.exe application is started. After Winlogon.exe completes its internal initialization it looks into the system registry to obtain the name of the graphical identification and authentication DLL to load. The multiple user desktop graphical identification and authentication DLL name is placed in the register during its install processes so Winlogon.exe will find and load the multiple user desktop graphical identification and authentication.

After loading the multiple user desktop graphical identification and authentication Winlogon.exe and the multiple user desktop graphical identification and authentication must communicate initialization information, handle secure attention sequence monitoring and notification, and permit logoff and shutdown activities.

The state of Winlogon.exe determines which graphical identification and authentication function is called to process any given secure attention sequence event. Communications occur in the order shown here:

1. Event: Workstation Boot.
   Description:
   a. Winlogon calls the multiple user desktop graphical identification and authentication's WlxNegotiate function to notify the graphical identification and authentication about its version and what Support Functions are available.
   b. Winlogon calls the multiple user desktop graphical identification and authentication's WlxInitialize function to give the graphical identification and authentication the addresses of the support functions, a handle to Winlogon, and to obtain the multiple user desktop graphical identification and authentication's context information (This is an opaque internal memory buffer created by multiple user desktop graphical identification and authentication and is to be passed in all future calls to the graphical identification and authentication's exported functions).
   c. Current State: Winlogon is in the logged-out state.
2. Event: No one is Logged On.
   Description: The multiple user desktop graphical identification and authentication monitors devices for secure attention sequence events, like Ctrl-Alt-Del.
   a. The multiple user desktop graphical identification and authentication calls Winlogon's WlxSasNotify function when an secure attention sequence event has been received.
   b. Winlogon calls the graphical identification and authentication's WlxLoggedOutsecure attention sequence function, allowing the graphical identification and authentication to process a user's identification and authentication information. The multiple user desktop graphical identification and authentication does process the user's Logon Credentials but does not return them to Winlogon; it instead creates the desktop, runs the profile and policies and sends back the "System" user. This is done to prevent problem when the first user logs off the system which in turn would log everyone off. A default user is sent back to Winlogon that never logs off until the last user logs off or the system shuts down.
   c. Current State: When logon is successful, Winlogon is in the logged-on state.
3. Event: The user is logged on.
   Description: The multiple user desktop graphical identification and authentication monitors devices for secure attention sequence events.
   a. The multiple user desktop graphical identification and authentication calls Winlogon's WlxsasNotify function when an secure attention sequence event has been received.
   b. Winlogon calls the multiple user desktop graphical identification and authentication's WlxLoggedOnsecure attention sequence function, allowing the multiple user desktop graphical identification and authentication to present options to the user who is currently logged on.

4. Event: The user is logged on and wants to lock computer.

Description: The graphical identification and authentication monitors devices for secure attention sequence events, Like Ctrl-Alt-Del.

a. The multiple user desktop graphical identification and authentication calls Winlogon's WlxSasNotify function when an secure attention sequence event has been received.

b. Winlogon calls the multiple user desktop graphical identification and authentication's WlxLoggedOnsecure attention sequence function, the user who is currently logged on.

c. The multiple user desktop graphical identification and authentication returns WLX_secure attention sequence_ACTION_LOCK_WKSTA.

d. Current State: Winlogon is in the workstation-locked state

5. Event: The user is logged on; the workstation is locked; and the user wants to unlock computer: This is where the multiple user desktop graphical identification and authentication is SIGNIFICANTLY different from Microsoft's graphical identification and authentication.

Description: The graphical identification and authentication monitors devices for secure attention sequence events.

a. The graphical identification and authentication calls the WlxSasNotify function.

b. Winlogon calls the graphical identification and authentication's WlxWkstaLockedsecure attention sequence function.

c. The multiple user desktop graphical identification and authentication presents a normal Logon Screen.
   (1) If it is the same user who locked the Workstation the user Must perform a Logon as they did at the Logged out secure attention sequence.
   (2) If it is a new user then he or she may Logon to the system at this point.

d. The credentials are check to see if it is a new user or an existing user.
   (1) If it is a new user then a desktop is created and the Profile and policies are run for the user and the Desktop is set to point to the newly create one.
   (2) If it is an existing user then the Winlogon is called to set the desktop "on" corresponding to the user who unlocked the screen.

e. The graphical identification and authentication returns WLX_SAS_ACTION_UNLOCK_WKSTA.

6. Event: The user is logged on, and the program calls the ExitWindowsEx function:

Description: Winlogon calls the graphical identification and authentication's WlxLogoff function.

7. Event: The user is logged on and wants to log off using secure attention sequence:

Description: The multiple user desktop graphical identification and authentication monitors devices for secure attention sequence events.

a. The graphical identification and authentication calls the WlxSasNotify function.

b. Winlogon calls the graphical identification and authentication's WlxLoggedOnsecure attention sequence function.

c. If there are no more users running on the system or the user selected Logoff All users:
   (1) The graphical identification and authentication will return WLX_SAS_ACTION_LOGOFF
   (2) Winlogon will call the graphical identification and authentication's WlxLogoff function.

d. If there is another user Still logged on and the current user selects to log them off.
   (1) Then only this users desktop must be closed and it is locked up in the list.
   (2) WlxCloseDesktop is called to close the Desktop.
   (3) The multiple user desktop graphical identification and authentication Logs the user out of the system.
   (4) Multiple user desktop graphical identification and authentication returns.

The MUD GINA has the ability to allow multiple users to logon to a 32-bit Windows NT-based server or workstation simultaneously. Examples of 32-bit Windows NT-based operating systems include Windows NT 4.0 Server/Workstation, Windows 2000 Server/Workstation, and Windows XP systems. The MUD GINA can be used to securely allow multiple users to logon to a 32-bit Windows NT-based system (such as a Windows XP system) even if it is a member of a domain. Users can logon to the system from the Logged Out Splash Screen and from the Locked Screen. The MUD GINA allows the use of various security mechanisms such as passwords, human interface devices, fingerprint readers, biometric devices, Smart Cards (Tokens), and SecurID for authentication, either individually or in a "Multi-Factor" authentication process where any combination of the above could be specified to be used to perform the logon. The MUD GINA is a "high security" full replacement GINA that is capable of running without using any feature of the existing Microsoft GINA. In this way, high security installations can remove the Microsoft GINA from the system to prevent access to the system when it is running in what Microsoft calls "Safe Mode". Safe Mode will always load the Microsoft GINA (if it is on the system) and this Microsoft GINA allows login with only a password, thus circumventing the high security Multi-Factor login methods of replacement GINAS. If the MUD GINA is given the same name as the Microsoft GINA it can take its place and prevent the password only Login Security hole. The MUD GINA has extremely detailed audit trail logging, allowing much better control and monitoring of how secure resources are being accessed.

The MUD GINA is capable of creating individual multiple private desktops. This is a significant advantage over prior art methods which use a method called "window hiding". The window hiding method simply logs in a "Generic User" and when a person needs access to the system a "pseudo login" is performed which merely sets up the desktop for the new user and "hides" the windows of the previous user. The problem with this type of method is that all the hidden applications that are running can be accessed very easily though certain task managing applications; in other words, one user can access another user's programs by selecting and opening it in the Task Manager application. The end result is the appearance security without actually protecting secure resources from knowledgeable individuals. The MUD GINA actually creates a desktop for each of the users within the operating system and these desktops are created in protected memory that prevents other users from accessing the applications. In this way, the MUD GINA of the present invention prevents even a knowledgeable person from accessing another user' processes (applications and data).

To overcome these weaknesses, the MUD GINA is a full replacement GINA, meaning that it does not use any abilities of the existing Microsoft GINA. Many replacement GINAs are actually "Pass-Through" GINAs which means that they call on the Microsoft GINA to do all the work and they simply put up custom screens or collect authentication data for passing to the Microsoft GINA. It is not possible for these GINAs to run without the Microsoft GINA present on the system. In contrast, the MUD GINA does not call on any functions or require any contact with the Microsoft GINA. The result is increased security by having it not rely on another entity to do the authentication and increases what type of authentication can be performed within the system. With a Pass-through GINA all Authentication mechanisms must reduce the Authentication to one of two types; a User name and password or a certificate. This means that if an unscrupulous person knows either the User name and Password, or has access to the certificate, then they can bypass the multiple authentication levels and gain system access. The MUD GINA performs its own entire authentication of credentials, which means it does not "boil" anything down to a few simple credentials. If a User is required to perform a Smart Card Login with a SecurID token then this is the only way the user will be able to logon.

The "Achilles heel" of any pass-through GINA or one that cannot run without the Microsoft GINA present is the Safe Mode access problem. If a User reboots a system and enters "safe mode" then the Microsoft Operating system will not load 3rd party GINAs and will instead load the default Microsoft GINA. At this point a User is presented with a user name and password logon. The user name and password logon is much easier to crack than a Multi-Factor login method. Once access is obtained the 3rd part GINA can be removed from the system allowing access to it in "normal mode" via the standard Microsoft GINA. The MUD GINA addresses this by not requiring the Microsoft GINA to be present on the system. With the proper tools and installation, the MUD GINA can even be constructed to look and function like the Microsoft GINA which in turn can prevent a user from obtaining access to the system through the User name and Password hack.

Various modifications can be made to the present invention without departing from the apparent scope thereof.

It is claimed:

1. A computer-implemented method for secure access to computer resources on a computing system having an operating system with a default graphical identification and authentication (GINA) module and a Winlogon application including steps of:
   providing a local computing graphical identification and authentication (GINA) module compatible with the default operating system GINA module, where the computing GINA module is a multiple user desktop (MUD) GINA module;
   substituting the MUD GINA for the default operating system GINA;
   using the MUD GINA to provide secure access to the computer resources on the local computing module for one or more users, wherein each of the one or more users has a unique credential;
   logging on a system dummy-user with the Winlogon application;
   using the system dummy-user to maintain a logged-on state with the Winlogon application on the local computing module when at least one of the one or more users is logged-on with the unique credential specific to the at least one user;
   providing MUD GINA functionality for secure access to the computer resources, including intermittent logon and logoff by each of the one or more users; and
   using the MUD GINA functionality to logon and logoff the at least one of the one or more users while the system dummy-user logged-on state is maintained with the Winlogon application.

2. The method of claim 1, further comprising the steps of:
   a. providing a logging service application; and
   b. using the logging service application to monitor actions taken by a user of the computing resources.

3. The method of claim 1, wherein the operating system is a 32-bit Windows NT based operating system.

4. The method of claim 1, wherein the operating system is a 64-bit operating system.

5. The method of claim 1, wherein the operating system is one portion of a multiple operating system computing environment.

6. The method of claim 1, wherein the computing module is a DLL.

7. The method of claim 1, wherein the at least one user is more than one user.

8. The method of claim 7, wherein more than one user is logged in, each to their own desktop, with GINA access to lock, unlock, and change desktops.

9. The method of claim 1, wherein the unique credential includes at least one authentication factor in addition to a password.

10. A non-transitory computer-readable storage medium containing computer executable instructions for performing a method for providing secure access to computer resources located on a local computer system, comprising:
    multiple user desktop (MUD) means for creating and maintaining MUDs;
    means for graphical identification and authentication (GINA) which provides for secure MUDs;
    said means for GINA substitutes for the standard operating system GINA;
    means for logging on a system dummy-user with a Winlogon application;
    means for using the system dummy-user to maintain a logged-on state with the Winlogon application at the local computing module when at least one user is logged-on with a credential specific to the at least one user;
    providing MUD GINA functionality for secure access to the computer resources, including intermittent logon and logoff by at least one user;
    using the MUD GINA functionality to logon and logoff at least one user while the system user logged-on state is maintained with Winlogon; and
    said MUD means provides multiple user desktops capable of running concurrently on the local computer system while said means for GINA provides access security for each of the MUDs.

11. A computer system for providing secure access to computer resources at a local computing module using 32-bit Windows NT based operating systems, comprising:
    an MUD GINA DLL;
    said MUD GINA DLL substitutes for the standard operating system GINA;
    a system dummy-user for a Winlogon application configured to maintain a logged-on state with Winlogon at the local computing module when at least one user is logged-on with a credential specific to the at least one user;

said MUD GINA DLL configured to provide secure access to the computer resources, including intermittent logon and logoff by at least one user; and said MUD GINA DLL provides secure access to multiple user desktops while maintaining the system logged on with Winlogon by maintaining a dummy user on the local computer module.

12. The system of claim 11, further comprising:
a. a logging service application; and
b. said the logging service application monitors actions taken by a user of the computing resources.

13. The system of claim 11, wherein the operating system is a 32-bit Windows NT based operating system.

14. The system of claim 11, wherein the operating system is selected from a list consisting of Windows NT 4.0 workstation/server, Windows 2000 workstation/server, Windows XP, and a successor operating system.

15. The system of claim 11, wherein the operating system is one portion of a multiple operating system computing environment.

16. The system of claim 11, wherein the computer resources comprise at least one element selected from the list consisting of a computer, a workstation, a server, a kiosk, a nursing station, a bank teller terminal, a network, an application, an operating environment, a database, a computer-based control terminal, and a computer file.

17. A computer system for secure access to computer resources using 32-bit Windows NT based operating systems at a local computing module, comprising:

a substitute GINA DLL;

said substitute GINA DLL substitutes for the standard operating system GINA;

said substitute GINA DLL provides secure access to a user desktop while maintaining the system logged on at the local computing module with a Winlogon application by maintaining a dummy user when at least one user is logged-on with a separate credential specific to each user; and said substitute GINA DLL provides secure access to a user desktop, with intermittent logon and logoff by at least one user, while the user desktop and applications are running;

wherein said computer system provides for more than one user to be logged in concurrently to the local computing module, each to their own private desktop, with GINA access to lock, unlock, and change desktops.

18. The system of claim 17, wherein the more than one user is at least 13 users.

* * * * *